US012429844B2

United States Patent
Wang et al.

(10) Patent No.: US 12,429,844 B2
(45) Date of Patent: Sep. 30, 2025

(54) COMPUTER NUMERICAL CONTROL MACHINE, MACHINING METHOD THEREOF, AND SYSTEM

(71) Applicant: MAKEBLOCK CO., LTD., Guangdong (CN)

(72) Inventors: Jianjun Wang, Guangdong (CN); Yuanxiu Zhang, Guangdong (CN); Yunchao Zhou, Guangdong (CN); Huan Li, Guangdong (CN)

(73) Assignee: MAKEBLOCK CO., LTD., Guangdong (CN)

( * ) Notice: Subject to any disclaimer, the term of this patent is extended or adjusted under 35 U.S.C. 154(b) by 0 days.

(21) Appl. No.: 18/960,007

(22) Filed: Nov. 26, 2024

(65) Prior Publication Data

US 2025/0085687 A1   Mar. 13, 2025

Related U.S. Application Data

(63) Continuation of application No. PCT/CN2023/105246, filed on Jun. 30, 2023.

(30) Foreign Application Priority Data

| Jul. 1, 2022 | (CN) | .......................... 202210777391.2 |
| Jul. 1, 2022 | (CN) | .......................... 202210780787.2 |
| Dec. 30, 2022 | (CN) | .......................... 202211743699.1 |

(51) Int. Cl.
   *G05B 19/401*   (2006.01)
(52) U.S. Cl.
   CPC .. *G05B 19/401* (2013.01); *G05B 2219/45165* (2013.01)

(58) Field of Classification Search
   CPC .................... G05B 19/401; G05B 2219/45165
   See application file for complete search history.

(56) References Cited

U.S. PATENT DOCUMENTS

| 11,137,738 B2 | 10/2021 | Shapiro et al. |
| 2014/0148939 A1* | 5/2014 | Nakano .............. B23Q 17/2414 700/166 |
| 2014/0157610 A1* | 6/2014 | Garvey .................. G01B 21/04 33/503 |

(Continued)

FOREIGN PATENT DOCUMENTS

| CN | 109146781 | 1/2019 |
| CN | 111515522 | 8/2020 |

(Continued)

OTHER PUBLICATIONS

WIPO, International Search Report for PCT/CN2023/105246, Sep. 21, 2023.

*Primary Examiner* — Christopher E. Everett
(74) *Attorney, Agent, or Firm* — Hodgson Russ LLP

(57) ABSTRACT

The present application provides a computer numerical control (CNC) machine, a machining method and a device thereof. The method includes: acquiring spatial locations of measuring points for a machined object; establishing mapping relationships between the measuring points according to the spatial locations of the measuring points; and matching the mapping relationships according to a target processing graphic and carrying out machining of the target processing graphic on the machined object.

39 Claims, 17 Drawing Sheets

(56) References Cited

U.S. PATENT DOCUMENTS

| | | | | |
|---|---|---|---|---|
| 2015/0112470 A1* | 4/2015 | Chang | ................ | G05B 19/401 |
| | | | | 700/109 |
| 2016/0364869 A1* | 12/2016 | Siercks | ................ | G06K 7/1417 |
| 2017/0235293 A1* | 8/2017 | Shapiro | ................ | G05B 19/402 |
| | | | | 700/166 |
| 2018/0080766 A1* | 3/2018 | Johnson | ................ | G01C 3/08 |
| 2022/0206464 A1* | 6/2022 | Gosselin | ................ | G05B 19/40932 |

FOREIGN PATENT DOCUMENTS

| | | |
|---|---|---|
| CN | 111515523 | 8/2020 |
| CN | 112797915 | 5/2021 |
| CN | 112935353 | 6/2021 |
| CN | 114160961 | 3/2022 |

\* cited by examiner

COMPUTER NUMERICAL CONTROL MACHINE, MACHINING METHOD THEREOF, AND SYSTEM

CROSS-REFERENCE TO RELATED APPLICATION

This application is a continuation of International Application No. PCT/CN2023/105246, filed Jun. 30, 2023, which claims priority to Chinese Patent Application No. 202210777391.2, filed Jul. 1, 2022, Chinese Patent Application No. 202211743699.1, filed Dec. 30, 2022, and Chinese Patent Application No. 202210780787.2, filed Jul. 1, 2022. The entire disclosures of the above-identified applications are hereby incorporated herein by reference.

TECHNICAL FIELD

The present application relates to a field of laser machining, and more particularly, to a computer numerical control machine, a machining method thereof, and a system for a computer numerical control machine.

BACKGROUND

With the development of a computer numerical control (CNC) machine from industry to terminal application, the CNC machine, no longer limited to its application in industry, becomes intelligent hardware available for terminals. People can implement machining on a machined object by using the CNC machine.

SUMMARY

There are provided a computer numerical control machine, a machining method thereof, and a system for a computer numerical control machine according to embodiments of the present application. The technical solution is as below:

According to a first aspect of an embodiment of the present application, the present application provides a machining method for a computer numerical control (CNC) machine. The method comprises:
  acquiring spatial locations of measuring points for a machined object;
  establishing mapping relationships between the measuring points according to the spatial locations of the measuring points; and
  carrying out machining of the target processing graphic on the machined object by matching the mapping relationships according to a target processing graphic.

According to a second aspect of an embodiment of the present application, the present application provides a computer numerical control (CNC) machine, which comprises:
  a housing;
  in at least one of a detector and a light source;
  a rail device used for enabling the detector and the light source to move;
  a memory;
  and a processor;
  wherein an internal space is formed in the housing, the detector, the light source and the rail device are arranged in the internal space, and the memory is configured to store computer-readable instructions; and
  wherein the processor in an electrical signal connection with the memory reads the computer-readable instructions stored in the memory to implement the aforementioned method.

According to a third aspect of an embodiment of the present application, the present application provides a system for a computer numerical control machine, comprising:
  at least one processor; and
  at least one non-volatile storage medium for storing instructions executable by the at least one processor;
  wherein the at least one processor is configured to:
  acquiring spatial locations of measuring points for a machined object;
  establishing mapping relationships between the measuring points according to the spatial locations of the measuring points; and
  carrying out machining of a target processing graphic on the machined object by matching the mapping relationships according to the target processing graphic.

It should be understood that both the foregoing general description and the following detailed description are exemplary only and are not restrictive of the present application.

DESCRIPTION OF THE DRAWINGS

The above and other objects, features and advantages of the present application will become more apparent from the detailed description of example embodiments thereof with reference to the accompanying drawings.

DETAILED DESCRIPTION OF EMBODIMENTS

Figure 1:
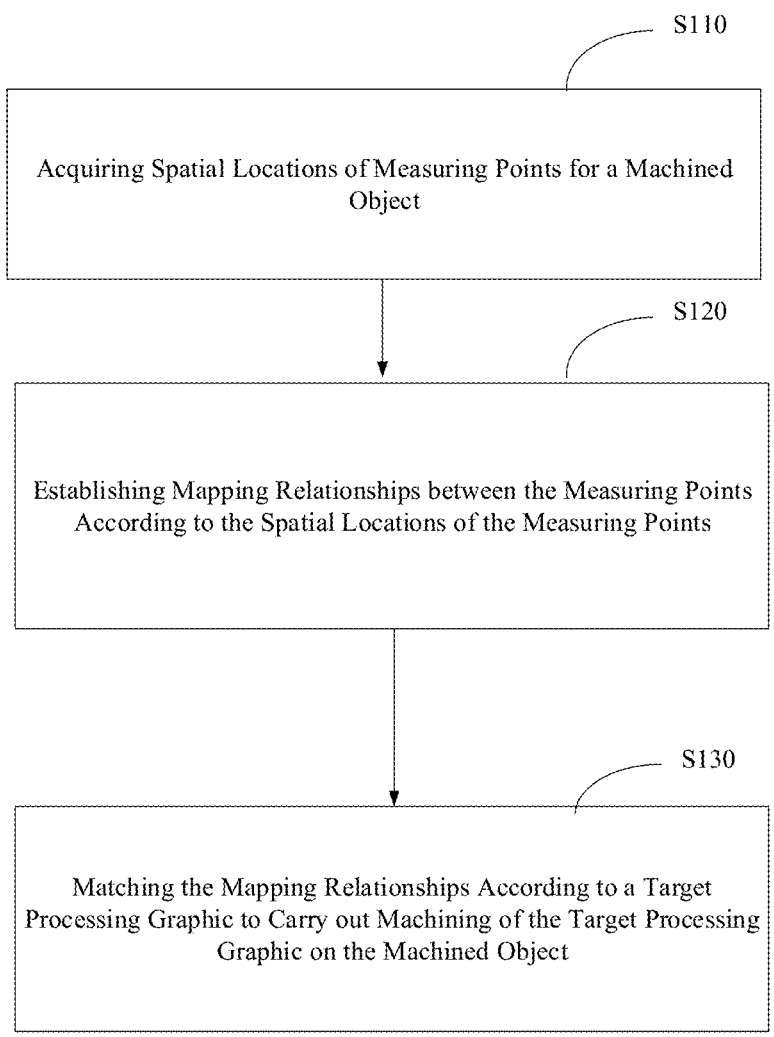
FIG. 1 is a flow diagram of a machining method according to an embodiment of the present application.

Various example embodiments will now be described more fully with reference to the accompanying drawings. Example embodiments may, however, be embodied in many alternate forms and should not be construed as limited to only the embodiments set forth herein. On the contrary, these example embodiments are provided so that this application will be described more thoroughly and completely, and will fully convey the conception of the example embodiments to those skilled in the art. The drawings are only schematic representations of the present application and are not necessarily drawn to scale. The same reference numbers are used throughout the drawings to refer to the same or like parts, so a repeated description thereof will be omitted.

Furthermore, features, structures or characteristics described are capable of being combined in one or more example embodiments in any suitable way. In the following description, numerous specific details are set forth in order to provide a thorough understanding of various example embodiments of the present application. One skilled in the art will recognize, however, that the technical solution of the present application can be practiced without one or more of the specific details, or with other methods, components, steps, and so forth. In other instances, well-known structures, methods, implementations or operations are not shown or described in detail to avoid obscuring aspects of the present application.

Some block diagrams shown in the drawings are functional entities and do not necessarily have to correspond to physically or logically independent entities. These function entities may be implemented in software, implemented in one or more hardware modules or integrated circuits, or implemented in different network and/or processor devices and/or microcontroller devices.

A computer numerical control (CNC) machine may serve as a terminal for a machining method to carry out measurements on measuring points generated by a machined object with reference to configured hardware devices thereof and to acquire spatial locations of the measuring points to construct a space model to carry out accurate machining on the machined object.

Referring to FIG. 1, FIG. 1 is a flow diagram of a machining method according to an embodiment of the present application. An embodiment of the present application provides steps of a machining method, including:

Step S110, acquiring spatial locations of measuring points for a machined object;

Step S120, establishing mapping relationships between the measuring points according to the spatial locations of the measuring points; and Step S130, carrying out machining of the target processing graphic on the machined object based on the mapping relationships matching with a target processing graphic.

The above 3 steps are described in detail below.

The machined object is a workpiece to be machined, providing an area to be machined for the CNC machine to carry out machining, for example, laser carving and/or laser cutting and other machining processes to be carried out in the area to be machined provided by the machined object. It should be clear that the machined object includes but is not limited to a metal material and a wood material.

It should be understood that the area to be machined provided by the machined object may be planar or curved.

In Step S110, the measuring points are configured to calibrate the area to be machined on the machined object. In other words, the measuring points are related to the area to be machined on the machined object. Thus, the measuring points can be in any location matched with the area to be machined, which is not limited here. In the process of implementing Step S110, only the measuring points matched with the area to be machined of the machined object need to be determined, and then the spatial locations of the measuring points are obtained. The spatial locations of the measuring points refer to three-dimensional locations of the measuring points. Measuring in the machining process is implemented by acquiring the measuring points related to the machined object, and then accurate machining on the machined object is implemented through accurate measurement.

Acquisition of the measuring points related to the machined object includes an implementation process on the machined object and an implementation process on a bearing surface of the machined object. In other words, according to differences in machining operations to be carried out, the measuring points acquired for the machined object are located on the machined object and/or on the bearing surface of the machined object.

During the process of carrying out machining on the machined object, the spatial locations of the measuring points are acquired on the machined object or the bearing surface of the machined object. The acquired spatial locations of the measuring points are used for determining a spatial location of the area to be machined of the machined object to provide a data support for the CNC machine to carry out machining operations on the machined object.

Different implementation processes can be implemented to acquire the spatial locations of the measuring points for the machined object in different embodiments. Exemplarily, the acquiring process of the measuring points is set forth respectively in the following three implementation ways.

In some embodiments (1): carrying out shooting on irradiation points on the measuring points determined for the machined object to determine pixel locations of the irradiation points on a shot image, and then acquiring the spatial locations of the measuring points according to the pixel locations of the irradiation points.

In some embodiments (2): detecting the measuring points one by one through a configured positioning device to acquire the spatial locations of the measuring points.

In some embodiments (3): carrying out light splitting on light beams to form a light source coverage area for the machined object to indicate the existence of the measuring points, carrying out shooting on the light source coverage area to obtain a light source projected image, and acquiring the spatial locations of the measuring points according to pixel locations of pixels in the light source projected image corresponding to the measuring points.

Any one of the above implementation processes of acquiring the spatial locations of the measuring points can be selected as required, the two or more above embodiments can be implemented under the support of hardware to further guarantee high reliability of acquiring the spatial locations of the measuring points.

The implementation process set forth according to the embodiment (1) will be described in detail below.

Step S110 implemented in the embodiment (1) includes: obtaining the spatial locations of the measuring points by capturing irradiation points formed by emitted light beams on the measuring points of a machined object.

It should be clear that in the embodiment of the present application, to complete measuring of the measuring points, the CNC machine is configured with a movable head (such as a movable laser head or a movable cutting tool), a visible light emitter or a camera on the hardware level, and the movable head carries out machining on the machined object through movement control and laser emission; the visible light emitter emits visible light to carry out positioning for machining of the CNC machine, for example, positioning the measuring points; and the camera is configured to carry out shooting on the measuring points to acquire the pixel locations of the irradiation points.

In the embodiment of the present application, the light beams are emitted towards the measuring points determined based on the area to be machined, and the light beams may be visible light or other light rays capable of being captured and identified by the camera, which is not limited here. Specifically, the visible light emitter configured in the CNC machine is used for emitting visible light towards the measuring points to form light spots on the measuring points, and the light spots are the irradiation points of the emitted light beams on the measuring points.

The measuring points can be determined by the directing of the light beams, and the spatial locations of the measuring points are further determined through light spots thereof.

The irradiation points are formed on the measuring points to trigger the camera to carry out shooting on the irradiation points to obtain a shot image of the irradiation points on the measuring points, and the spatial locations of the measuring points are computed according to pixel locations of the irradiation points identified on the shot image.

Figure 2:
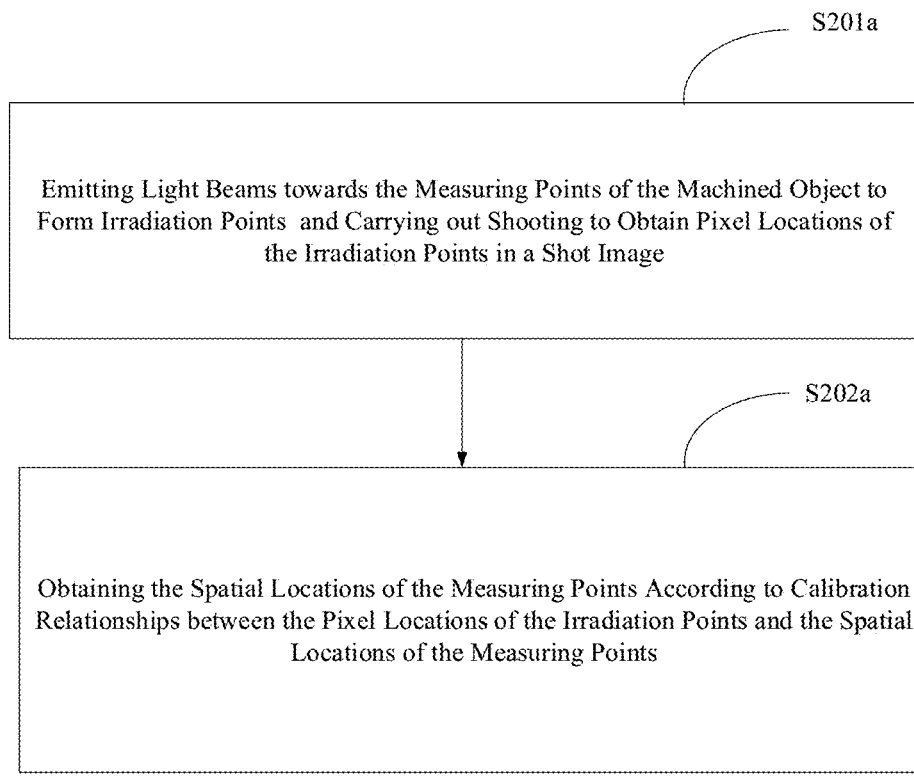
FIG. 2 is a flow diagram of the step of obtaining spatial locations of measuring points by capturing irradiation points formed by emitted light beams on the measuring points of the machined object according to an embodiment of the present application.

Referring to FIG. 2, FIG. 2 is a flow diagram of the step of obtaining the spatial locations of the measuring points by capturing the irradiation points formed by the emitted light beams on the measuring points of the machined object according to an embodiment of the present application. The step of obtaining the spatial locations of the measuring points by capturing the irradiation points formed by the emitted light beams on the measuring points of the machined object according to the embodiment of the present application includes:

Step S201a, emitting light beams towards the measuring points of the machined object to form irradiation points and carrying out shooting to obtain pixel locations of the irradiation points in a shot image; and Step S202a, obtaining the spatial locations of the measuring points according to calibration relationships between the pixel locations of the irradiation points and the spatial locations of the measuring points.

The two steps will be described in detail below.

Step S201a, emitting light beams towards the measuring points to form irradiation points on the measuring points and then triggering to carry out shooting to obtain a shot image of the irradiation points and obtain pixel locations of the irradiation points in the shot image. The pixel locations of the irradiation points refer to pixel locations of pixels mapped from the irradiation points in the shot image.

The shot image is obtained by shooting after emitting the light beams, i.e., the shot image includes image display of the irradiation points formed by the light beams.

The light beams form the irradiation points on the measuring points, and the pixel locations of the irradiation points are represented in a form of pixel coordinates. Exemplarily, the pixel locations of the irradiation points can be represented through X-axis coordinates in a pixel coordinate system of the image, and the unit thereof is a pixel.

In Step S202$a$, the calibration relationships between the pixel locations of the irradiation points and the spatial locations of the measuring points are pre-calibrated. The pixel locations of the irradiation points are substituted into the calibration relationships to obtain the spatial locations of the measuring points corresponding to the irradiation points.

The above calibration relationships indicate coordinate values mapped from the pixel locations of the irradiation points in a CNC machine coordinate system, and the coordinate values form the spatial locations of the measuring points. The spatial locations of the measuring points represent physical coordinates of the measuring points in the CNC machine coordinate system. For example, the spatial locations of the measuring points include coordinate values of the measuring points on an X-axis, a Y-axis and a Z-axis in the CNC machine coordinate system, and the units thereof can be mm.

According to the calibration relationships between the pixel locations of the irradiation points and the spatial locations of the measuring points, carry out shooting and capturing on the irradiation points formed by emitting the light beams in advance to obtain the corresponding shot image, and identify the shot image to obtain the pixel locations of the irradiation points and acquire the spatial locations of the irradiation points in the CNC machine coordinate system. Acquire the pixel locations of different irradiation points and the spatial locations of the irradiation points multiple times, and finally carry out linear fitting through a plurality of groups of data to obtain the calibration relationships.

The irradiation points are located on the measuring points, so the spatial locations of the irradiation points are the same as the spatial locations of the measuring points, i.e., the obtained calibration relationships between the pixel locations of the irradiation points and the spatial locations of the irradiation points are calibration relationships between the pixel locations of the irradiation points and the spatial locations of the measuring points.

Figure 3:
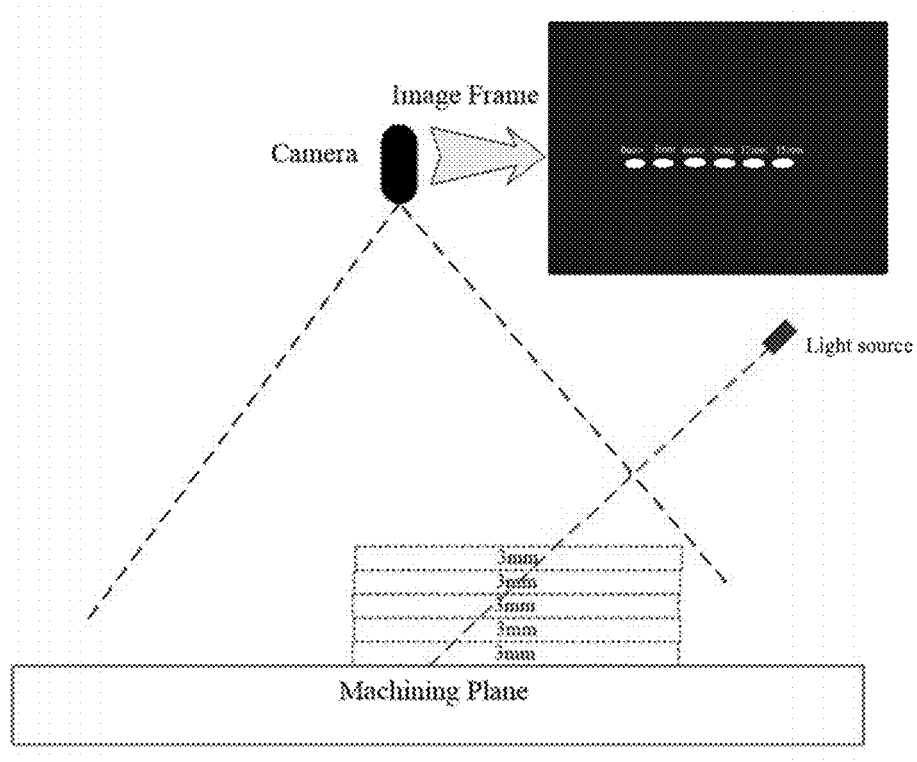
FIG. 3 is a schematic diagram of a calibration process according to an embodiment of the present application.

The aforementioned content is the implementation of the calibration process. The obtained calibration relationships indicate corresponding relationships between the pixel locations of the irradiation points and the spatial locations of the measuring points. Referring to FIG. 3, FIG. 3 is a schematic diagram of a calibration process according to an embodiment of the present application. In this embodiment, the same light beam emitted forms irradiation points in different locations of the machined object at different heights to correspond to the spatial locations of the irradiation points in the CNC machine coordinate system, namely the spatial locations of the irradiation points.

The shot image obtained by shooting in the calibration process can be identified to obtain the pixel locations of the irradiation points represented in unit pixels. Thus, as shown in FIG. 3, mappings between the pixel locations of the irradiation points and the spatial locations of the irradiation points formed at a set height will be calibrated at the set height. For example, the set height starts at 0 mm with 3 mm as an increased rate of height, the height is increased again and again at the increased rate of height, and every time the height is increased, irradiation points are formed through emitted light beams and then shot to obtain pixel locations of the irradiation points at a current height and the spatial locations of the irradiation points.

Figure 4:
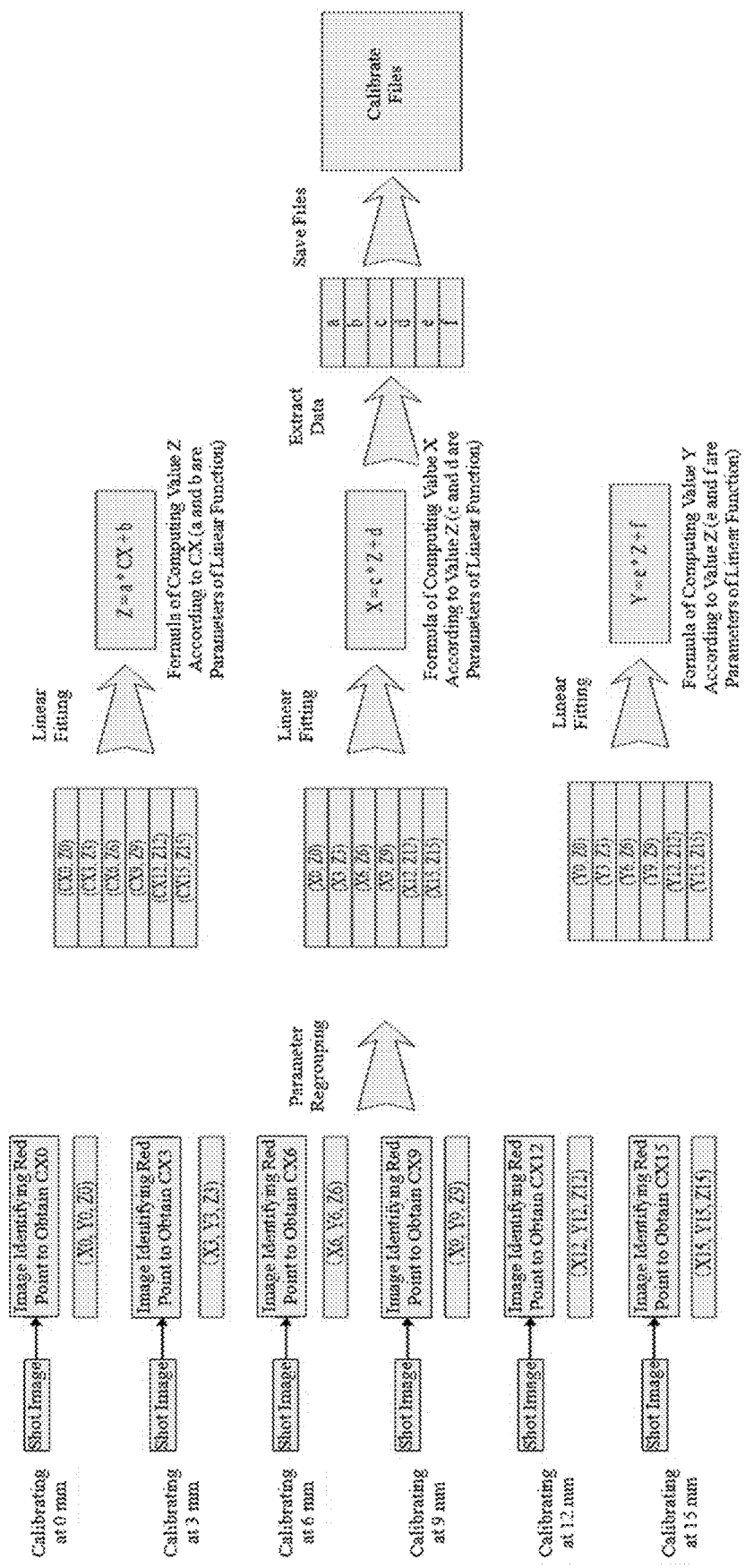
FIG. 4 is a flow diagram of a schematic diagram of linear fitting according to an embodiment of the present application.

In turn, the pixel locations of the irradiation points at each height and the spatial locations of the irradiation points can be obtained. To carry out linear fitting between the pixel locations of the irradiation points and the spatial locations of the irradiation points, as previously mentioned, the spatial locations are composed of physical coordinates in the CNC machine coordinate system, so the pixel locations of the irradiation points and the spatial locations of the irradiation points corresponding to each height are regrouped to obtain three groups of parameters. FIG. 4 shows a processing flow diagram of the calibration process according to an embodiment of the present application. As shown in FIG. 4, at each height, such as from 0 mm to 15 mm, start at 0 mm with 3 mm as the increase rate of height, calibration is carried out at each height, such as 0 mm, 3 mm, 6 mm, 9 mm, 12 mm and 15 mm.

Referring to FIG. 4, FIG. 4 is a flow diagram of a schematic diagram of linear fitting according to an embodiment of the present application. At the time of calibration at each height, a group of parameters is obtained from the shot image, namely the pixel locations CX of the irradiation points and the spatial locations (X, Y. Z) of the irradiation points, and then the group of parameters are regrouped.

For example, during the calibration process at a height, the obtained pixel locations CX of the irradiation points and the spatial locations (X, Y. Z) of the irradiation points form a group, the group is regrouped in pairs according to the pixel locations of the irradiation points and coordinate values thereof to obtain three groups of parameters, namely (CX, Z), (X, Z) and (Y, Z).

In turn, at each height, three groups of parameters are obtained by regrouping. For all the heights, the same group of parameters are collected, for example, all (CX, Z) s are collected together to carry out linear fitting, such as carrying out linear fitting on (CX0, Z0), (CX3, Z3), (CX6, Z6), (CX9, Z9), (CX12, Z12) and (CX15, Z15).

The regrouping is matched to obtain mappings from the spatial locations of the irradiation points to the coordinate values through the linear fitting, the mappings specifically including mapping from the spatial locations to Z-axis coordinate values, a mapping from X-axis coordinate values to the Z-axis coordinate values and a mapping from Y-axis coordinate values to the Z-axis coordinate values, and so on, and to obtain mappings from the pixel locations of the irradiation points to the spatial locations of the irradiation points.

Exemplarily, the mappings from the pixel locations of the irradiation points to the spatial locations of the irradiation points indicate coordinate values in the pixel locations of the irradiation points and the spatial locations of the irradiation points and relationships between the coordinate values. The relationships can be represented through linear functions and coefficients thereof. Therefore, the coordinate values of the pixel locations of the irradiation points and the spatial locations of the irradiation points and the coefficients used in the corresponding linear functions between the coordinate values will be obtained through linear fitting. The corresponding linear functions can be determined according to the coefficients, and the relationships between the spatial locations of the irradiation points mapped from the pixel locations of the irradiation points can be obtained.

For example, as shown in FIG. 4, the linear function obtained from linear fitting between the pixel locations CX of the irradiation points and a coordinate value, namely the Z-axis coordinate value, is Z=a*CX+b; the linear function obtained from linear fitting between the X-axis coordinate value and the Z-axis coordinate value is X=c*Z+d; the linear function obtained from linear fitting between the Y-axis coordinate value and the Z-axis coordinate value is Y=e*Z+f.

a, b, c, d, e and f are coefficients read from a calibration file obtained in the calibration implementing process.

Thus, the calibration file is formed by the coefficients obtained by extracting linear fitting formulas. Correspondingly, during the measurement carried out on the measuring points, the calibration relationships between the pixel locations of the irradiation points and the spatial locations of the irradiation points can be obtained just by calling the calibration file. Because the irradiation points in the CNC machine coordinate system are located on the measuring points, the spatial locations of the irradiation points are the same as the spatial locations of the measuring points. During the measurement carried out on the measuring points, the spatial locations of the measuring points can be obtained by substituting the pixel locations of the irradiation points into the above calibration relationships.

Figure 5:
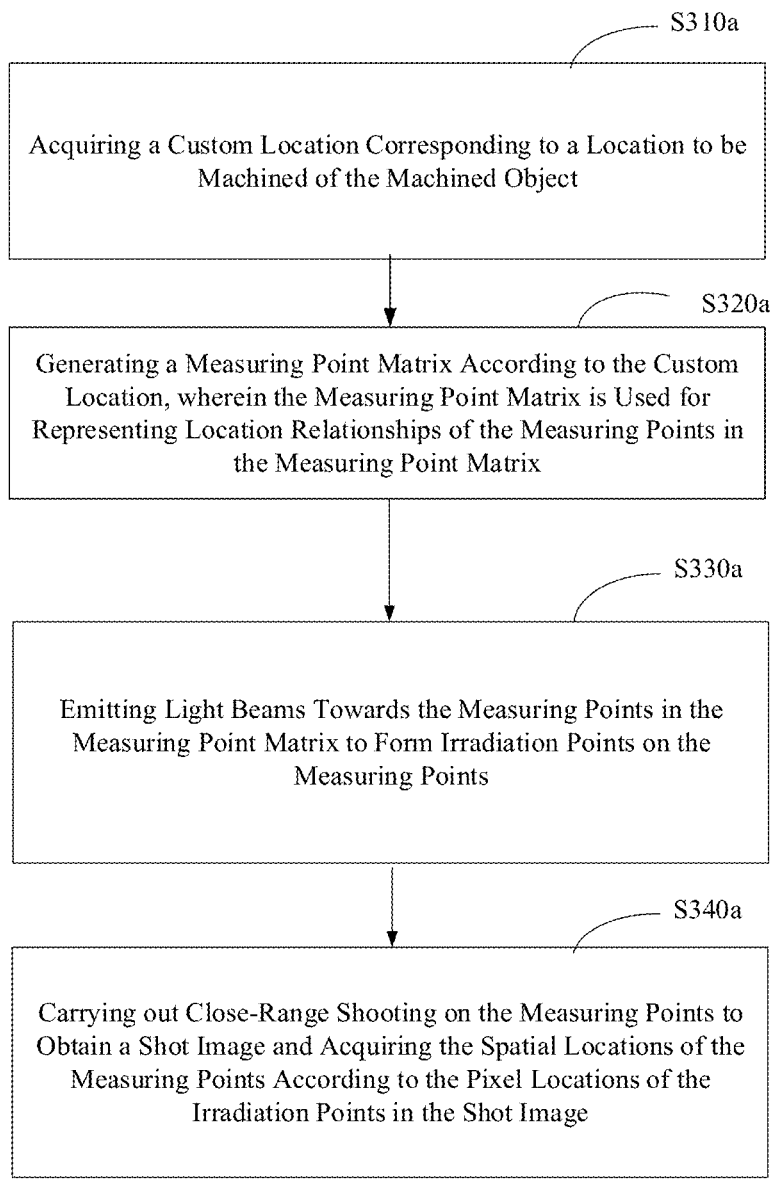
FIG. 5 is a flow diagram of capturing irradiation points formed by emitting light beams on the measuring points of the machined object according to an embodiment of the present application.

See FIG. 5, FIG. 5 is a flow diagram of obtaining the spatial locations of the measuring points by capturing the irradiation points formed by the emitted light beams on the measuring points of the machined object according to an embodiment of the present application. The step of obtaining the spatial locations of the measuring points by capturing the irradiation points formed by the emitted light beams on the measuring points of the machined object according to the embodiment of the present application includes:

Step S310a, acquiring a custom location corresponding to a location to be machined of the machined object;

Step S320a, generating a measuring point matrix according to the custom location, wherein the measuring point matrix is used for representing location relationships of the measuring points in the measuring point matrix;

Step S330a, emitting light beams towards the measuring points in the measuring point matrix to form irradiation points on the measuring points; and Step S340a, carrying out close-range shooting on the measuring points to obtain a shot image and acquiring the spatial locations of the measuring points according to pixel locations of the irradiation points in the shot image.

The 4 steps will be described in detail below.

Figure 30:
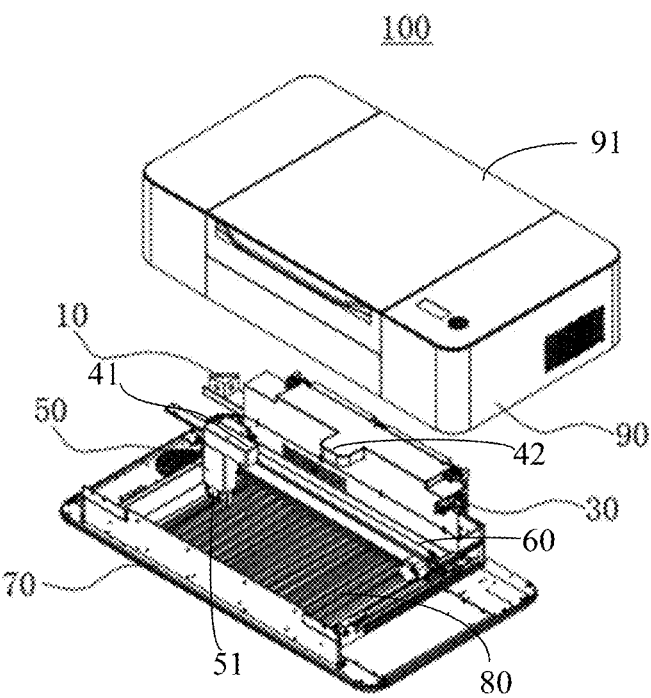
FIG. 30 is a schematic diagram of hardware of the CNC machine according to an embodiment of the present application.

In Step S310a, according to machining demands, a custom location is selected on a plane where the machined object is located and/or a bearing plane 80 (as shown in FIG. 30) of the machined object, a measuring point matrix is loaded to the custom location, and an area of the measuring point matrix includes a necessary area to be machined of the machined object. The custom location serves as a reference for positioning the measuring point matrix and provides the reference for positioning of the measuring point matrix.

In Step S320a, the measuring point matrix is generated by reference to the above custom location. Exemplarily, a measuring point matrix of 5×5 is generated by taking the custom location as a center point, and to be further clear, the measuring point matrix may not be embodied, which is not further limited here. According to an embodiment of the present application, light beams can be emitted directly by a light source to form an array, and the array formed by the irradiation points is a measuring point matrix.

To be clear, in an embodiment of the present application, the area of the measuring point matrix is selected through an upper computer by taking the custom location as the center of the measuring point matrix according to measurement demands of a user, and the numbers of the measuring points on each row and column in the measuring point matrix are set to generate the measuring point matrix.

Exemplarily, before the measuring point matrix is generated, the CNC machine shoots an image of the machined object through a camera, the image displays the area where the measuring point matrix is positioned, and the user selects the area of the measuring point matrix according to the machining demands for a product. After the area is selected, the number of the measuring points in the measuring point matrix is selected, for example, in the same area, a 3×3 array, a 4×8 array, an 8×8 array or the like is selected.

To be clear, areas to be machined or non-machined areas are distributed on the machined object. In the embodiment of the present application, the measuring point matrix generated during the measurement process covers the area to be machined and the non-machined area of the machined object, in other words, the measuring point matrix includes an array of the area to be machined and an array of the non-machined area.

A higher number of the measuring points are selected in the array of the area to be machined and a lower number of the measuring points are selected in the array of the non-machined area to form a difference of measurement data in each area. When carrying out data measurement on the machined object, a traditional CNC machine in the market often measures the whole machined object without differentiating between the area to be machined and the non-machined area. As a result, when the user needs a high-accuracy measurement of the area to be machined, the CNC machine also carries out high-accuracy measurement on the non-machined area, so its data computation amount is increased greatly, and the efficiency declines substantially.

In the implementation of the machining method according to the present application, the CNC machine freely selects the measurement accuracy of the area of each point matrix to form the difference of area data measurements, and the controllability of the area of the measuring point matrix is realized. On the one hand, the data support of subsequence machining is not affected, and on the other hand, unessential measurements are decreased greatly, and the data computation amount of each area measurement is greatly reduced.

So far, by realizing the controllability of the area of the measuring point matrix and the controllability of the numbers of the measuring points in each row and column of the measuring point matrix, the computation amount of the CNC machine during the modeling process of a space model is greatly reduced.

In another embodiment of the present application, the shot image is obtained during the process of carrying out shooting by emitting light beams to form multiple points of the array. The multiple points of the array formed by emitting the light beams may be obtained in different time domains in the measuring point matrix. Correspondingly, the multiple measured measuring points are distributed to form the measuring point matrix.

In Step S330a, the light beams are emitted to the measuring points in the measuring point matrix to display the irradiation points on all the measuring points simultaneously or irradiate the measuring points in the measuring point matrix one by one to form the irradiation points on the measuring points respectively.

In addition, in another embodiment of the present application, the measuring points can be directed by emitting the light beams, and the irradiation points formed by the light beams are the measuring points in the measuring point matrix.

In Step S340a, the shot image obtained by shooting may correspond to one of the irradiation points or all the irradiation points in the measuring point matrix. The number of the shot image is matched with the measuring point matrix, not limited to a single image. The pixel locations of the irradiation points are acquired according to the shot image, and the spatial locations of the measuring points are obtained according to the calibration relationships between the pixel locations of the irradiation points and the spatial locations of the corresponding measuring points.

Figure 6:
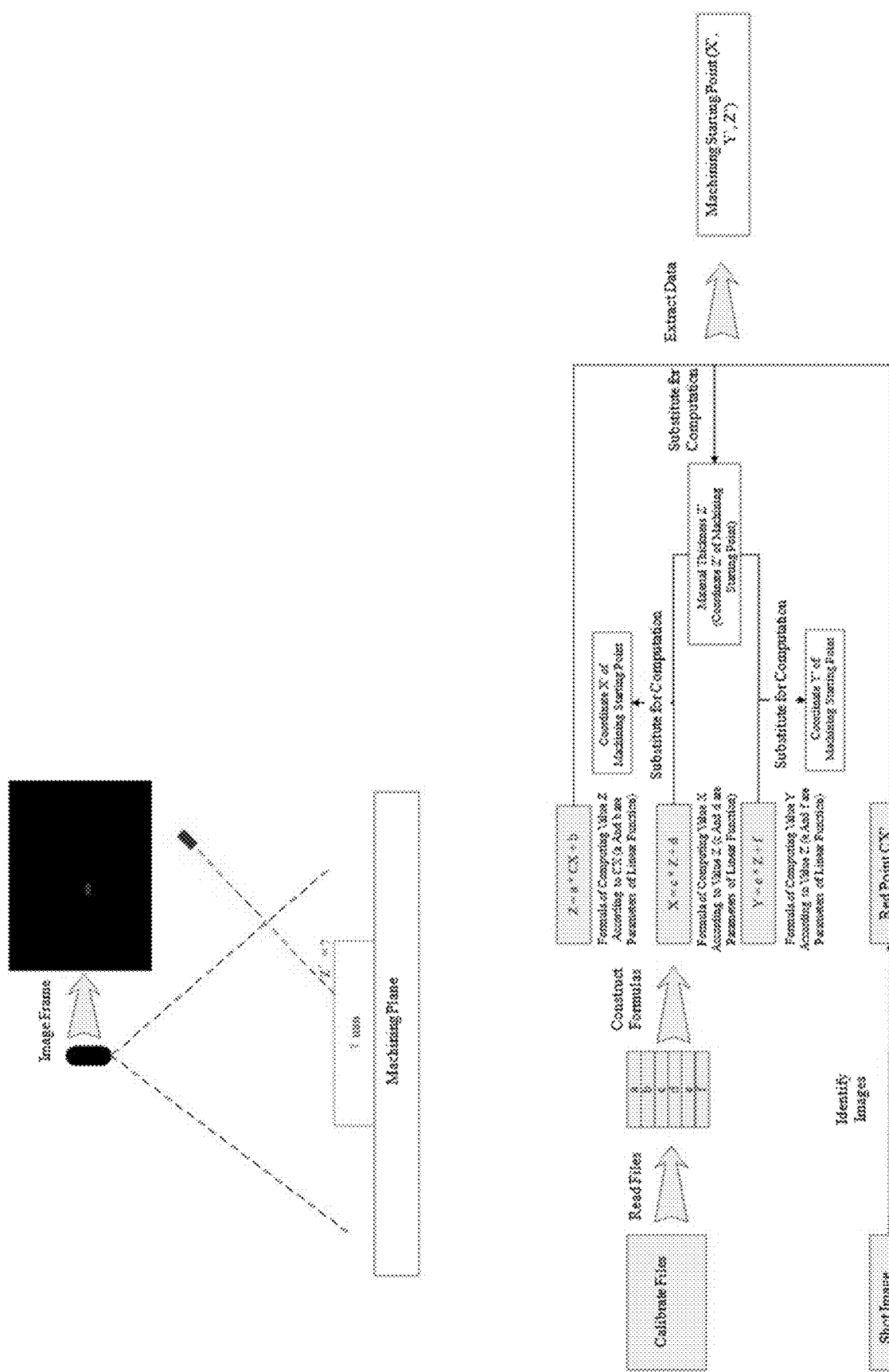
FIG. 6 is a flow diagram of computing the spatial locations of the measuring points under calibration relationships according to an embodiment of the present application.

See FIG. 6, FIG. 6 is a flow diagram of computing the spatial locations of the measuring points under the calibration relationships according to an embodiment of the present application. As shown in FIG. 6, in the specific computation, the coefficients are read from the calibration file, the read coefficients construct a formula, namely constructs a linear function between the spatial locations of the measuring points and one coordinate value: $Z=a*CX+b$, and a linear function between the coordinate values: $X=c*Z+d$, and $Y=e*Z+f$.

The image obtained by shooting, namely an image of the irradiation points formed by the light beams, is identified to obtain a spatial location CX', and sequential computation is carried out through the constructed linear functions to obtain Z', Y' and X'; and Z', Y' and X' form the spatial locations of the measuring points.

To be clear, with regard to the pixel location of the irradiation point acquired according to the shot image, because the shot image is a content description that the camera in the CNC machine captures the irradiation point formed by the light beam and the captured irradiation point is expressed through a pixel on the shot image, the shot image can be subjected to image identification to obtain the pixel of the irradiation point, and finally the pixel location of the irradiation point is obtained through the pixel location of the captured irradiation point.

In this way, the pixel location of one irradiation point is obtained. In the same way, the pixel locations of the irradiation points are obtained by shooting images of the multiple measuring points corresponding to a multipoint array.

Machining is carried out on the machined object through the measuring point matrix to achieve measurements of the plurality of measuring points, and the spatial locations of the areas of the measuring points are determined more accurately.

Distinguished from the measuring point matrix, the CNC machine also can carry out single-point measurements. On the one hand, the measured point matrix can be supplemented through the spatial location of a measured single measuring point, and on the other hand, the measuring point matrix is generated through the spatial locations of the measured single measuring points just by carrying out multiple single-point measurements.

Therefore, the step of obtaining the spatial locations of the measuring points by capturing irradiation points formed by emitted light beams on the measuring points of the machined object further includes:

carrying out the single-point measurements to obtain the spatial locations of the measured single measuring points, the single-point measurements serve as supplementary measurements of the measuring point matrix or measurements of the single measuring points. The measurements of the single measuring points mean that only the single-point measurements are carried out during the measurements of the measuring points.

In addition, generated errors of the measuring point matrix are remedied through the single-point measurements, for example, to carry out the single-point measurements on missing measuring points of the measuring point matrix, the missing measuring points are supplemented for a series of obtained measuring points of the measuring point matrix so that it is not necessary to carry out multiple repeated measurements because of errors of the measuring point matrix, fault tolerance of the measuring point matrix is greatly increased, and the measurement efficiency is improved.

When the single-point measurements are carried out, shooting is still carried out in this way to obtain the corresponding shot image, the shot image is identified to obtain the pixel locations of the irradiation points, and the spatial locations of the measuring points are obtained according to the calibration relationships between the pixel locations of the irradiation points and the spatial locations of the measuring points.

An embodiment of the present application further provides a method for denoising measuring points of a measuring point matrix after measurements are carried out on the measuring point matrix and before single-point measurements. After the measuring point matrix is formed, a computer numerical control (CNC) machine reasonably denoises the measuring points according to spatial locations of the measuring points and displays the denoised measuring points. A user artificially screens out and cancels noisy points in the measuring point matrix. A close-range camera 41 and a visible light emitter are moved to remeasure locations of the noisy points through the single-point measurements.

The method for denoising the measuring points of the measuring point matrix includes machine denoising and manual denoising. Machine denoising means that the CNC machine determines a floating range of a spatial location of a measuring point adjacent to a certain measuring point by analyzing the spatial location of the measuring point after measurements of the measuring point matrix. If the spatial location of the measuring point is not within the floating range, the measuring point is regarded as a noisy point and canceled.

To prevent a prediction error of the floating range of the spatial location of the measuring point because of the adjacent measuring point of the measuring point being the noisy point, a noisy point misjudgment is made on the measuring point. When a certain measuring point is determined as a noisy point and canceled, a spatial location of the canceled measuring point is supplemented through a single-point measurement. If through the single-point measurement, the spatial location of the measuring point is in accordance with that of the measuring point before being canceled, multiple single-point measurements are carried out again according to system settings. If the spatial location of the measuring point is consistent, the measuring point is determined not to be a noisy point. After that, machine denoising is carried out on the adjacent measuring point of the measuring point according to the spatial location of the measuring point.

Manual denoising means that the measuring point matrix is displayed according to the spatial locations of the measuring points, and because the measuring point matrix is three-dimensional and has three-dimensional features, the user can directly observe all the measuring points to check whether each measuring point drifts away from the measuring point matrix or not and manually cancel the checked measuring point drifting away.

The close-range camera 41 and the visible light emitter are moved to move the center point to the location of the canceled point to carry out a single-point measurement and supplement the canceled measuring point.

Compared to measurement results of other CNC machines, the number of noisy points is greatly reduced because of cancelability of the measuring points and machine and manual dual denoising. The generated errors of the measuring point matrix are remedied through the single-point measurements, so that it is not necessary to carry out multiple repeated measurements because of the errors of the measuring point matrix, the fault tolerance of the measuring point matrix is greatly increased, and the measurement efficiency is improved.

Figure 7:
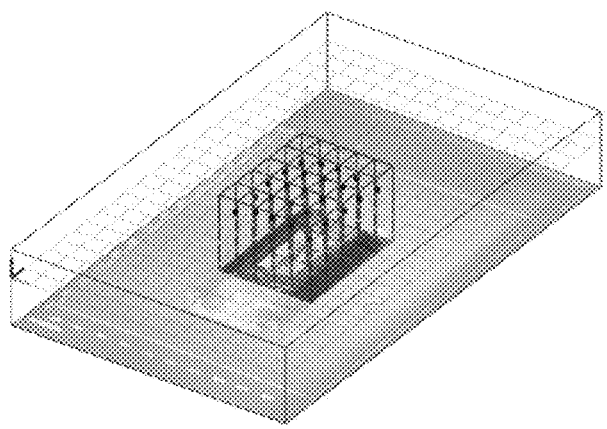
FIG. 7 is a schematic diagram of carrying out measurements of a measuring point matrix according to an embodiment of the present application.
Figure 8:
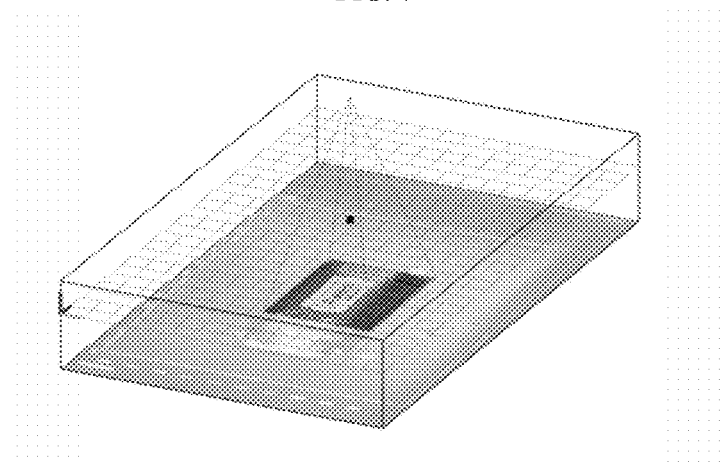
FIG. 8 is a schematic diagram of carrying out single-point measuring according to an embodiment of the present application.

See FIG. 7, FIG. 7 is a schematic diagram of carrying out measurements of a measuring point matrix according to an embodiment of the present application. The machined object is a curved machined object. M rows and N columns of locations are moved in a rectangular area above the machined object, and the single-point measurements are carried out time by time through the visible light emitter. A rectangular array composed of the measuring points is formed. In the areas of the measuring points, light beams are emitted to the measuring points to form irradiation points on the curved machined object, shooting is carried out on the curved machined object containing the irradiation points, locations of the irradiation points are obtained through pixel locations of the irradiation points captured through the shot image, and a spatial location of each measuring point is acquired until the measurements of all the measuring points in the measuring point matrix are completed. See FIG. 8, FIG. 8 is a schematic diagram of carrying out single-point measurements according to an embodiment of the present application. For the single-point measurements, a certain point on the curved machined object is selected as a measuring point, shooting is carried out after emitting light beams to obtain parameter data of locations of the irradiation points between the light beams and the curved machined object as supplementary measurements of area measurements or as measuring point measurements of non-area measurements.

The implementation process set forth according to the embodiment (2) will be described in detail below.

Figure 9:
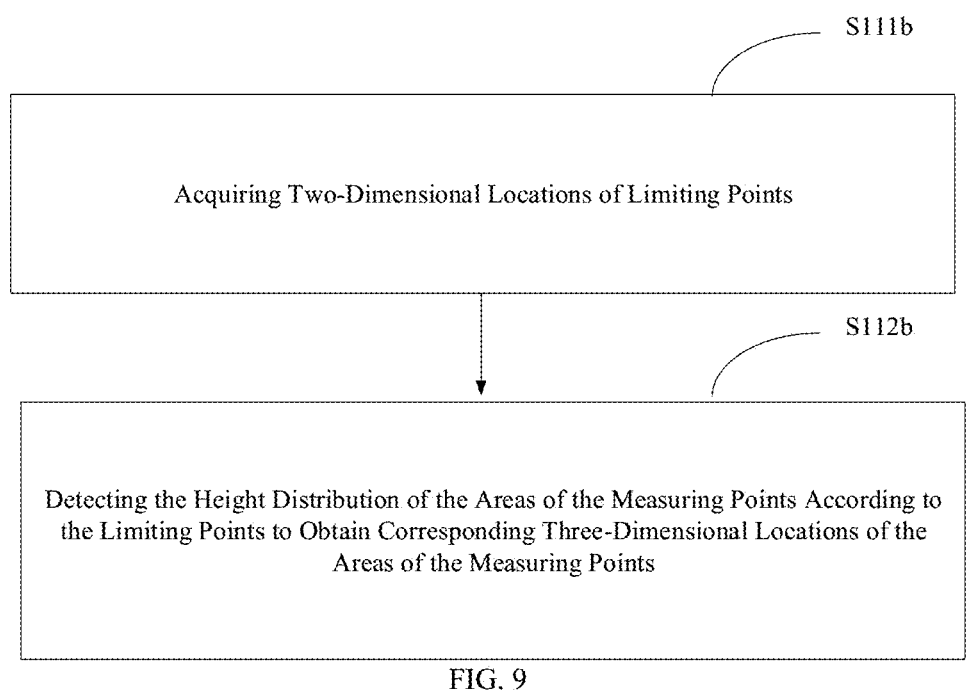
FIG. 9 is a flow diagram of acquiring the spatial locations of the measuring points for the machined object according to an embodiment of the present application.

See FIG. 9, FIG. 9 is a flow diagram of acquiring the spatial locations of the measuring points for the machined object according to an embodiment of the present application. The step S110 of acquiring the spatial locations of the measuring points for the machined object according to the embodiment of the present application includes:

Step S111b, acquiring two-dimensional locations of limiting points; and

Step S112b, detecting a height distribution of the areas of the measuring points according to the limiting points to obtain corresponding three-dimensional locations of the areas of the measuring points.

The above two steps will be described in detail below.

In Step S111b, firstly select the limiting points on the machined object when carrying out machining on the machined object, wherein the limiting points are used for indicating the areas of the measuring points. The areas where the measuring points are located are areas to be machined and measured of the machined object. The purpose of acquiring spatial locations of the areas of the measuring points is to provide machining data for machining the machined object, make a machining path of the machined object clear and realize accurate machining on the machined object.

To be clear, the edges of the areas of the measuring points may be on the machined object or a plane for bearing the machined object, which is not limited here.

The CNC machine is configured with a positioning device, which includes but is not limited to a position sensor for acquiring two-dimensional locations of the limiting points. It should be added that the two-dimensional locations of the limiting points describe the locations mapped from the limiting points relative to a horizontal plane, such as a horizontal plane for bearing the machined object. Exemplarily, the two-dimensional locations of the limiting points can be represented through two-dimensional coordinates mapped from the limiting points.

In an embodiment of the present application, the positioning device configured in the CNC machine is used for acquiring the two-dimensional locations of the limiting points. Exemplarily, the position sensor configured in the CNC machine can be driven to move to the limiting points, and the position sensor can feed back its two-dimensional coordinates in the CNC machine coordinate system in real time, i.e., can acquire the two-dimensional locations of limiting points.

The limiting points are used for indicating areas of the measuring points. Exemplarily, a circular area obtained by taking a limiting point as a circle center and a preset distance as a radius is an area where the measuring points are located; or a rectangle with a preset side length is obtained by taking a limiting point as an intersection point of diagonals is an area where the measuring points are located, or a rectangle obtained by taking a connecting line between two limiting points as a diagonal is an area where the measuring points are located, or a square obtained by taking a connecting line between two limiting points as one side of the square is an area where the measuring points are located, or a circular area obtained by taking a connecting line between two limiting points as a diameter of the circular area is an area where the measuring points are located. According to machining demands, the area wherein the measuring points are located can be defined according to different numbers of limiting points.

In another embodiment of the present application, to acquire the two-dimensional locations of the limiting points, the CNC machine is configured with at least one light source and/or detector. Light spots formed by the light source emitting light beams can be used for positioning the limiting points according to the present application. Exemplarily, the light spots are moved to the limiting points, and two-dimensional locations of the light spots are the two-dimensional locations of the limiting points. Besides this, the light source can be used for carrying out machining. Based on this, in the present application, the light source used for emitting the light spots include a laser emission light source (a machining light source) and a visible light emission light source, and all of them can be used for positioning the limiting points.

To be further explained, in the embodiment of the present application, for example, as shown in FIG. 30, the visible light emission light source and the detector 51 can be arranged in a movable head of the CNC machine, for example, the movable head can be a laser head 50 and/or a cutter head for cutting and the like.

In other words, the light source of the CNC machine is used for positioning the limiting points and laser machining based on this. The laser emission light source, a combination of the laser emission light source and the visible light emission light source, a combination of the laser emission light source and the detector 51 and a combination of the visible light emission light source and the detector 51 are distributed on the movable head, and the laser head is provided with any one of combinations of the laser emission light source, the detector 51 and the visible light emission light source.

In the case that the laser head is provided with the laser emission light source, positioning the limiting points and laser machining are carried out through the laser emission light source; when the laser head is provided with a combination of the laser emission light source and the visible light emission light source, positioning the limiting points can be carried out through the laser emission light source or the visible light emission light source, and then laser machining is carried out through the laser emission light source. When the laser head is provided with a combination of the laser emission light source and the detector 51, positioning the limiting points can be carried out through the detector 51 or the laser emission light source, and laser machining is carried out through the laser emission light source. When the laser head is provided with a combination of the laser emission light source, the detector 51 and the visible light emission light source, positioning limiting points can be carried out through the detector 51, the visible light emission light source or the laser emission light source, and then laser machining is carried out through the laser emission light source.

In the process of positioning the limiting points through the light spots, firstly, the light source are driven to emit light beams to irradiate a plane of the machined object or a plane for bearing the machined object to form light spots. The light spots are used for indicating locations irradiated by the light beams emitted from the current light source, and the limiting points are positioned based on the locations.

The light source emit the light beams to the machined object or the plane for bearing the machined object to form the light spots. When the light source and the light spots may not be in the same vertical line, the two-dimensional locations of the light source are in accordance with the two-dimensional locations of the light spots. However, based on the light source and the light spots possibly not in the same vertical line, the two-dimensional locations of the light source are not necessarily the locations of the light spots. In view of the above condition, relative location relationships of the light source and the light spots are obtained in advance. In other words, as long as the two-dimensional locations of the light source are known, the locations of the light spots can be obtained according to the relative location relationships between the light source and the light spots. The locations of the light spots and the two-dimensional locations of the light source are used for recording locations of the light source and the light spots in the CNC machine coordinate system.

It should be clear that different machine types of the CNC machine are matched and different choices are made for positioning the limiting points. As previously mentioned, the limiting points can be positioned by moving the light spots or through locations close to tail ends of the movable detector 51.

Specifically, on the one hand, firstly, positioning the limiting points is carried out by driving the light source to move to emit the light beams to irradiate the limiting points and form the light spots on the limiting points; and secondly, the two-dimensional locations of the limiting points are determined according to the locations of the light spots. The limiting points refer to selected points on the machined object or the plane for bearing the machined object. In an embodiment of the present application, the selected points on the horizontal plane for bearing the machined object refer to the limiting points selected near the machined object to indicate an area measured on the surface of the machined object.

On the other hand, the detector 51 is driven to move up and down so that the tail ends of the detector 51 get close to the machined object underneath or the plane where the machined object is located to indicate the two-dimensional locations of the detector 51. The detector 51 are continuously moved to coincide with the limiting points; and finally, the two-dimensional locations of the detector 51 are obtained, namely the locations of the limiting points. To be clear, the two-dimensional locations of the detector 51 and the locations for recording the locations of the detector 51 in a coordinate system where the machined object is located, namely the locations of the detector 51, the light source and the light spots, indicate their locations in the CNC machine coordinate system.

To be clear, the term "laser emission light source" used herein includes any electromagnetic radiation energy source, any focused energy source or any coherent energy source capable of giving out electromagnetic energy to make photons to modify a substrate or cause some changes or a change on a material hit by the photons. The laser emission light source (whether a cutting tool or a diagnostic tool) can emit any required wavelength. Laser emission includes, for example, microwaves, lasers, infrared lasers, visible light lasers, UV lasers, X-ray lasers, ray lasers and the like.

To be further clear, in another embodiment of the present application, for movements of the light source or the detector 51, the light source or the detector 51 can be moved to specified locations according to instruction information to allow the light spots or the tail ends of the detector 51 to be located at the limiting points.

In addition, the light source or the detector 51 also can be pulled by the user to move, which is not limited here. The instruction information is generated by operation actions initiated by the user on an upper computer composed of a control panel of a terminal device of the CNC machine.

Figure 10:
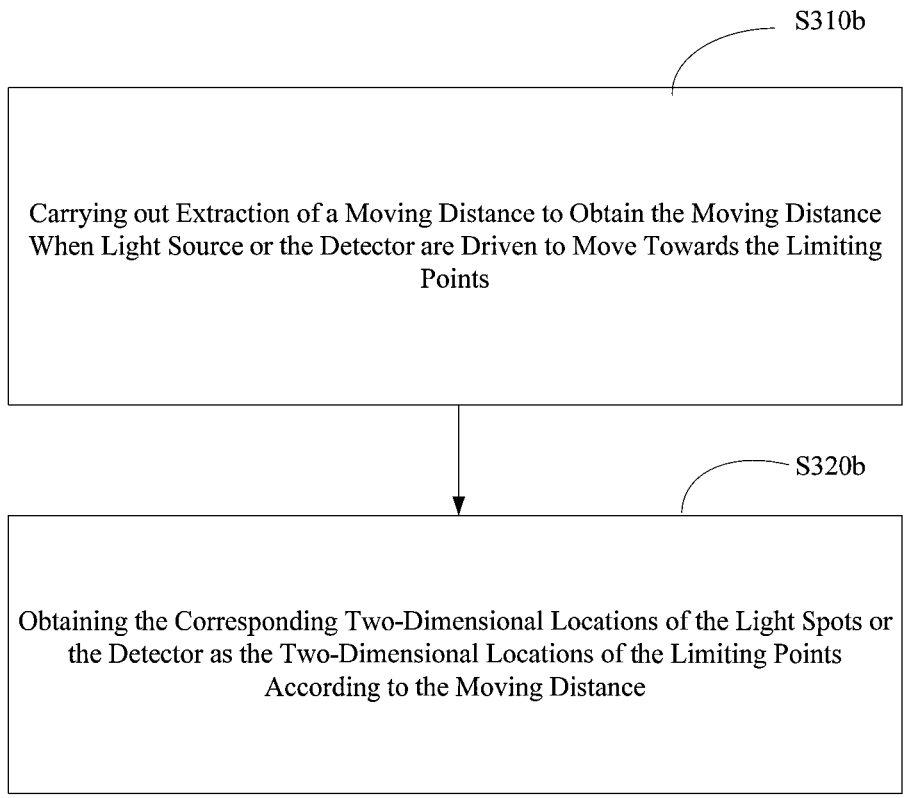
FIG. 10 is a flow diagram of positioning locations where tail ends of light spots or detector are located as limiting points and obtaining two-dimensional locations of the limiting points according to an embodiment of the present application.

See FIG. 10, FIG. 10 is a flow diagram of obtaining two-dimensional locations of the limiting points based on two-dimensional locations corresponding to the light spots or probes according to an embodiment of the present application. The embodiment of the present application provides the step of obtaining the two-dimensional locations of the limiting points according to the two-dimensional locations corresponding to the light spots or the probes, including:

Step S310*b*, carrying out extraction of a moving distance to obtain the moving distance when the light source or the detector 51 are driven to move towards the limiting points; and Step S320*b*, obtaining the two-dimensional locations corresponding to the light spots or the detector 51 as the two-dimensional locations of the limiting points according to the moving distance.

The above two steps will be described in detail below.

In Step S310*b* of acquiring the two-dimensional locations of the light source or the detector 51, the light source or the detector 51 carry out computation of the moving distance with an original point of the coordinate system as a starting point, moving distances of the light source or the detector 51 on number axes of the CNC machine coordinate system are acquired according to the movement of the light source or the detector 51, and then the two-dimensional locations of the light source or the detector 51 are obtained according to the moving distances of the light source or the detector 51 on the number axes.

To be clear, in an embodiment of the present application, the light source or the detector 51 should be first returned to their original locations to prevent the situation that the two-dimensional locations of the light source or the detector 51 are not clear or not accurate enough because the moving distances of the light source or the detector 51 cannot be accurately acquired at present. After returning to their original locations, the moving distances of the light source or the detector 51 start to be computed with the original point of the CNC machine coordinate system as the starting point, and the two-dimensional locations of the light source or the detector 51 are made accurate to ensure accuracy degrees of the subsequently acquired two-dimensional locations of the light source or the detector 51.

Returning the light source or the detector 51 to the original locations means that the light source or the detector 51 are moved to the original point of the CNC machine coordinate system. Specifically, the light source or the detector 51 can be returned to the original locations or moved according to the instruction information to the original point of the CNC machine coordinate system; or the user can directly handhold the light source or the detector 51 to pull the light source or the detector 51 to return the light source or the detector 51 to the original point of the CNC machine coordinate system.

To be further clear, in another embodiment of the present application, when the two-dimensional locations of the light source can be determined to be accurate, the light source may not be necessarily returned to the original locations, and the moving distances acquired directly along with movements of the light source serve as the two-dimensional locations of the light source. Computing the two-dimensional locations of the light source is carried out according to the movements of the light source relative to the original point of the CNC machine coordinate system. As long as without external influence factors, the movements of the light source are not recorded, so the light source do not need to be returned to their original locations.

In an embodiment of the present application, the CNC machine synchronously displays cursors corresponding to the two-dimensional locations of the light spots or the detector 51 on a display device in real time according to the moving distances of the light source or the detector 51.

In Step S320*b*, after the moving distances of the light source or the detector 51 on the number axes of the CNC machine coordinate system are acquired according to the movements of the light source or the detector 51, carry out computation to acquire the two-dimensional locations of the light source or the two-dimensional locations of the detector 51, and obtain the locations of the tail ends of the light spots or the detector 51 according to relative location relationships between the light source and the light spots or relative location relationships between the detector 51 and the tail ends of the detector 51, namely obtain the two-dimensional locations of the limiting points.

Figure 11:
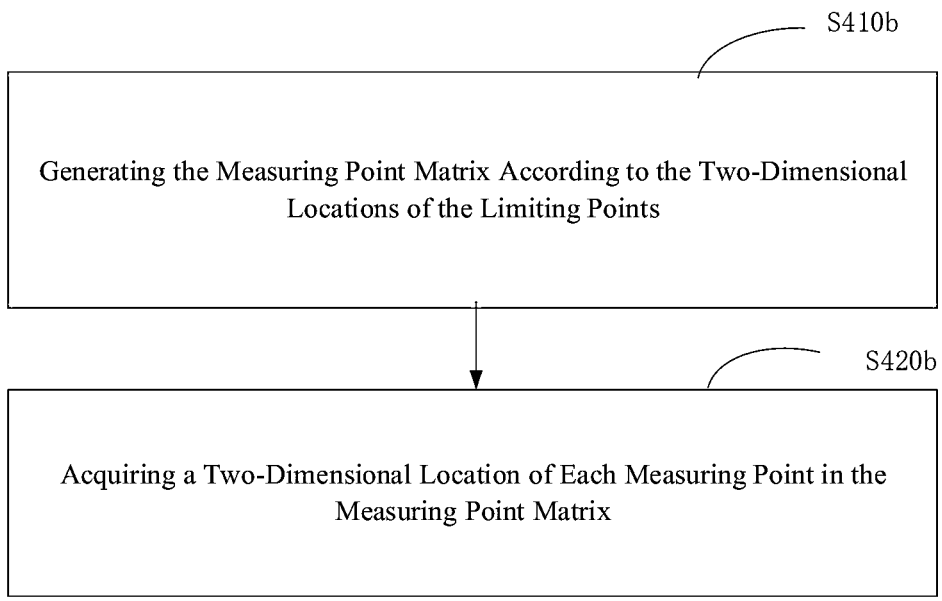
FIG. 11 is a flow diagram of a method for measuring spaces before obtaining spatial locations corresponding to areas of the measuring points according to an embodiment of the present application.

Referring to FIG. 11, FIG. 11 is a flow diagram of a method for measuring spaces before obtaining spatial locations corresponding to areas of the measuring points according to an embodiment of the present application. The embodiment of the present application provides the steps of the method for measuring spaces before obtaining spatial locations corresponding to areas of the measuring points, including:

Step S410*b*, generating a measuring point matrix according to the two-dimensional locations of the limiting points; and Step S420*b*, acquiring a two-dimensional location of each measuring point in the measuring point matrix.

The above two steps will be described in detail below.

In Step S410*b*, acquiring a height distribution of areas of the measuring points can be achieved by: a measuring point matrix can be formed by setting a plurality of measuring points in the areas of the measuring points, the measuring points in the measuring point matrix are detected to obtain heights of the measuring points to acquire the height distribution of the areas of the measuring points.

The measuring point matrix is generated based on the two-dimensional locations of the limiting points. The two-dimensional locations of the limiting points provide a reference for the generation of the measuring point matrix. Exemplarily, when the number of the limiting points is 1, an upper left vertex of a rectangular measuring point matrix coincides with the limiting point to generate the measuring point matrix. Of course, the measuring points coinciding with the limiting points can not only be the vertex of the rectangular measuring point matrix but also can be any other measuring point.

To be further explained, the two-dimensional locations of the limiting points only provide a location reference for the generation of the measuring point matrix, and the limiting points may not coincide with the measuring points. The measuring point matrix may be rectangular, circular or in other shapes, which is not limited here.

In Step S420*b*, because the measuring point matrix is formed based on the two-dimensional locations of the limiting points, there are corresponding relationships between the measuring point matrix and the limiting points. The two-dimensional locations of the measuring points in the measuring point matrix can be computed based on the corresponding relationships according to the two-dimensional locations of the limiting points, for example, the measuring points in the measuring point matrix coincide with the limiting points.

According to spacing distance relationships between rows and columns in the measuring point matrix, exemplarily, distances between rows and columns in the measuring point matrix remain constant. Alternatively, spacings between the rows and spacings between the columns in the measuring point matrix remain constant. The spacings between the rows in the measuring point matrix also remain constant. The spacings between the columns in the measuring point matrix also remain constant. The spacing distances between the rows and the spacing distances between the columns may be inconsistent. At this time, according to the corresponding relationships between the measuring point matrix and the limiting points, the two-dimensional locations of the measuring points in the measuring point matrix can be obtained.

Exemplarily, when the number of the limiting point is 1, an upper left vertex of the rectangular measuring point matrix coincides with a limiting point, i.e., the upper left vertex of the rectangular measuring point matrix coincide with the limiting point, and then the two-dimensional location of each measuring point in the measuring point matrix is obtained according to a two-dimensional location of a measuring point at the upper left corner of the rectangular measuring point matrix and the spacing distance relationships between the rows and columns of the rectangular measuring point matrix.

Figure 12:
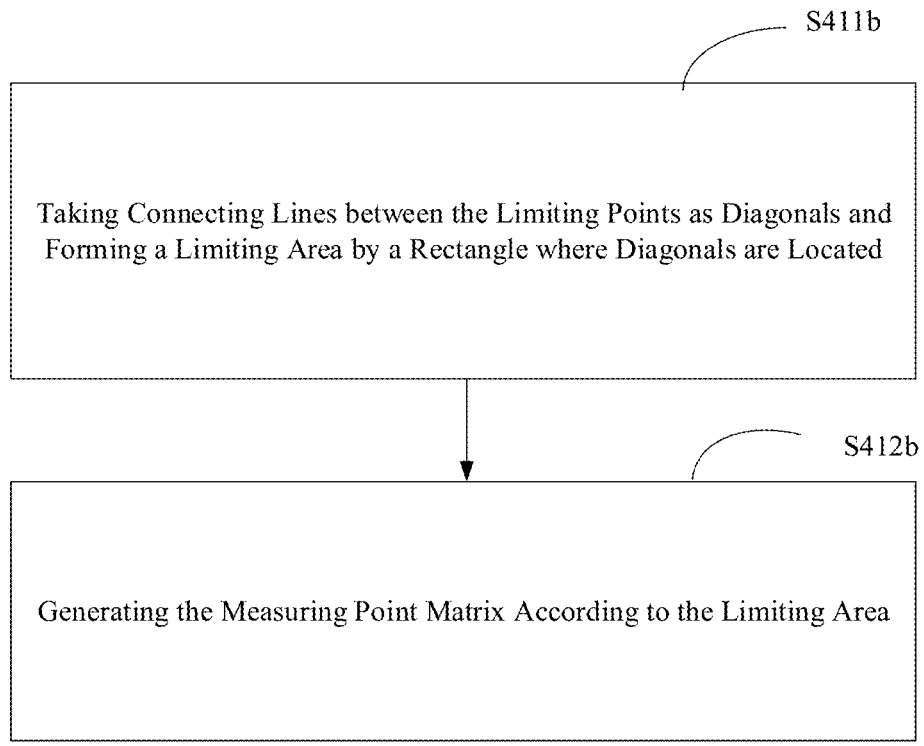
FIG. 12 is a flow diagram of generating a measuring point matrix based on the two-dimensional locations of the limiting points according to an embodiment of the present application.

See FIG. 12, FIG. 12 is a flow diagram of generating a measuring point matrix based on the two-dimensional locations of the limiting points according to an embodiment of the present application. The limiting points are distributed in the same straight line. In this embodiment, the limiting points are distributed in the same straight line. the embodiment of the present application provides Step S410b of generating the measuring point matrix according to the two-dimensional locations of the limiting points, including:

Step S411b, taking connecting lines between the limiting points as diagonals and forming a limiting area by a rectangle where the diagonals are located; and Step S412b, generating the measuring point matrix according to the limiting area.

The above two steps will be described in detail below.

In Step S411b, when the limiting points are located in the same straight line, all the limiting points are connected to obtain a line segment. A rectangle is obtained by taking the line segment as a diagonal, and the limiting area is used to provide a reference for generated locations of the measuring points. To be clear, any two limiting points can also be selected according to machining demands, and a rectangle is obtained by taking a connecting line between the two limiting points as a diagonal and serves as a limiting area.

In Step S412b, the measuring point matrix is generated according to the limiting area after the limiting area is determined. To be clear, the range of the measuring point matrix is not necessarily less than or equal to the limiting area and can also be greater than the limiting area. In addition, according to a demand for the accuracy of the height distribution of the areas of the measuring points, the distribution density of the measuring points can be adjusted.

According to the numbers of the rows and columns of the measuring point matrix and the corresponding relationships between the limiting points and the measuring point matrix, the two-dimensional locations of the measuring points in the measuring point matrix are computed.

Figure 13:
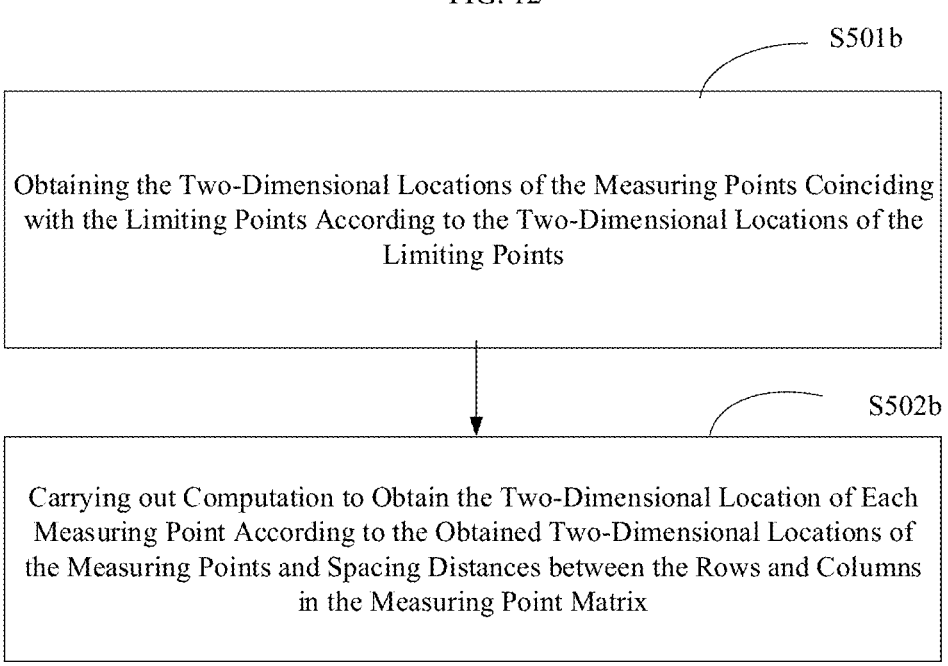
FIG. 13 is a flow diagram of carrying out computation to acquire the two-dimensional location of each measuring point in the measuring point matrix according to the two-dimensional locations of the limiting points and the numbers of rows and columns in the measuring point matrix according to an embodiment of the present application.

See FIG. 13, FIG. 13 is a flow diagram of carrying out computation to acquire the two-dimensional location of each measuring point in the measuring point matrix according to the two-dimensional locations of the limiting points and the numbers of the rows and columns in the measuring point matrix according to an embodiment of the present application. The embodiment of the present application provides the step of carrying out computation to acquire the two-dimensional location of each measuring point in the measuring point matrix according to the two-dimensional locations of the limiting points and the numbers of the rows and columns of the measuring point matrix, including:

Step S501b, obtaining the two-dimensional locations of the measuring points coinciding with the limiting points according to the two-dimensional locations of the limiting points; and Step S502b, carrying out computation to obtain the two-dimensional location of each measuring point according to the obtained two-dimensional locations of the measuring points and spacing distances between the rows and columns in the measuring point matrix.

The two steps will be described in detail below.

In Step S501b, one point in the measuring point matrix coincides with a limiting point, i.e., one measuring point in the measuring point matrix coincides with the limiting point, and the two-dimensional location of the measuring point coinciding with the limiting point is obtained according to the two-dimensional location of the limiting point.

In Step S502b, according to the numbers of the rows and columns of the measuring point matrix, the spacing distances between the rows and columns are preset, i.e., the spacing distances between the rows and columns in the measuring point matrix are fixed values. Exemplarily, for the measuring point matrix of 3×3, the spacing distances between the measuring points, namely between the rows and columns are always 3 cm. For the measuring point matrix of 5×5, the spacing distance between the rows is always 2 cm, the spacing between the columns is 2.5 cm, and alternatively, no matter how many rows and columns are there in the measuring point matrix, the spacing distances between measuring point matrices are the same.

According to the two-dimensional location of the measuring point coinciding with the limiting point and the spacing distances between the rows and columns of the measuring point matrix, the two-dimensional location of the measuring point adjacent to the measuring point is computed; and finally, the two-dimensional locations of the remaining measuring points are computed according to the measuring point at the known two-dimensional location.

Figure 14:
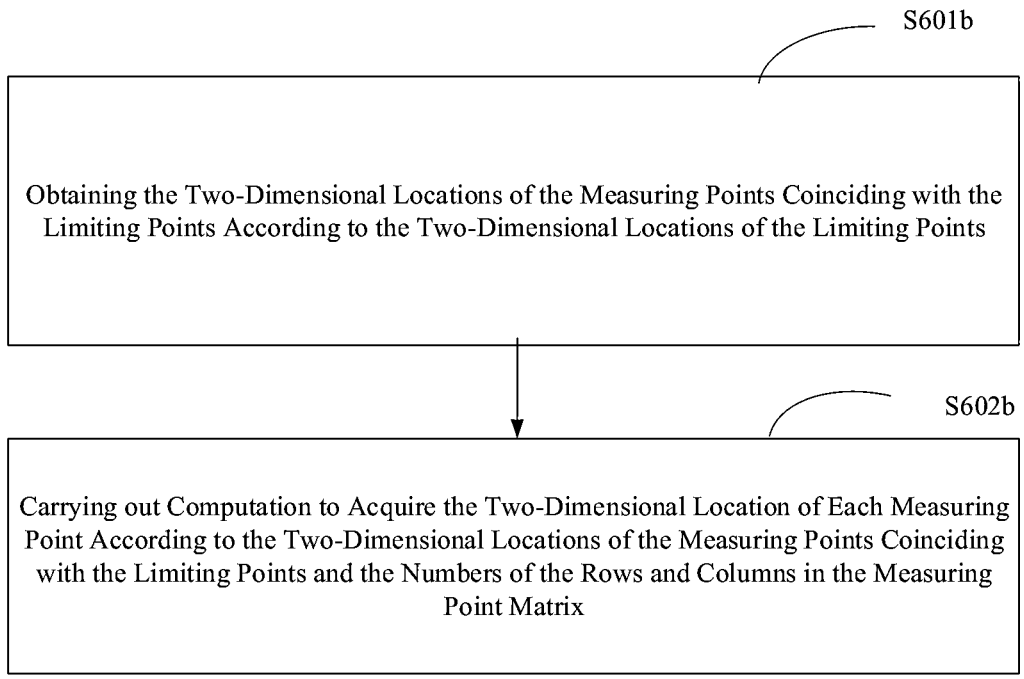
FIG. 14 is a flow diagram of carrying out computation to acquire the two-dimensional location of each measuring point in the measuring point matrix according to the two-dimensional locations of the limiting points and the numbers of rows and columns in the measuring point matrix according to an embodiment of the present application.

See FIG. 14, FIG. 14 is a flow diagram of carrying out computation to acquire the two-dimensional location of each measuring point in the measuring point matrix according to the two-dimensional locations of the limiting points and the numbers of the rows and columns in the measuring point matrix according to an embodiment of the application. The embodiment of the present application provides the step of carrying out computation to acquire the two-dimensional location of each measuring point in the measuring point matrix according to the two-dimensional locations of the limiting points and the numbers of the rows and columns of the measuring point matrix, further including:

Step S601b, obtaining the two-dimensional locations of the measuring points coinciding with the limiting points according to the two-dimensional locations of the limiting points; and Step S602b, carrying out computation to acquire the two-dimensional location of each measuring point according to the two-dimensional locations of the measuring points coinciding with the limiting points and the numbers of the rows and columns in the measuring point matrix.

In Step S601b, two measuring points in the measuring point matrix coincide with limiting points, i.e., two measuring points in the measuring point matrix coincide with the limiting points, and the two-dimensional locations of the measuring points coinciding with the limiting points are obtained according to the two-dimensional locations of the limiting points. To make two measuring points in the measuring point matrix coincide with the limiting points, the measuring point matrix can be stretched, i.e., to change spacing distances between the rows and/or columns in the measuring point matrix.

In Step S602b, the spacing distances between the rows of the measuring point matrix are equal, the spacing distances between the columns of the measuring point matrix are equal, and a rectangular area is formed by taking a connecting line between two limiting points as a diagonal. The spacing distances between the rows and the spacing distances between the columns of the measuring point matrix are obtained according to the numbers of the rows and columns of the measuring points in the rectangular area, and then the two-dimensional location of each measuring point in the measuring point matrix is obtained according to the two-dimensional locations of the measuring points coinciding with the limiting points.

Exemplarily, the two-dimensional locations of the limiting points are (a, b), (x, y) and (a>x, b>y) respectively, the rectangular area formed by taking the connecting line between the two limiting points as the diagonal contains 3 rows and 2 columns of measuring points (not including the measuring points coinciding with edges of the rectangular area), the computed spacing distance between the rows in the measuring point matrix is $$\frac{b-y}{4},$$

spacing distance between the columns is $$\frac{a-x}{3}.$$

According to the two-dimensional locations of the measuring points coinciding with the limiting points, the two-dimensional locations of the adjacent measuring points are computed, and the two-dimensional locations of the remaining measuring points are computed in sequence. If the measuring point is (a, b), the two-dimensional location of the adjacent measuring point on the right is $$\left(a+\frac{a-x}{3}, b\right),$$

and in turn, the two-dimensional locations of all the measuring points can be obtained.

In Step S112b, the detector 51 configured on the CNC machine are started to conduct detection on the areas of the measuring points at least once to obtain a height distribution of the areas of the measuring points. To be clear, when an area that the CNC machine is to measure is small enough, the area of a measuring point may be only a point, for example, the location of the limiting point is an area of the measuring point.

The two-dimensional locations of the measuring points can be obtained according to the two-dimensional locations of the limiting points; the detector 51 are driven to carry out detection to acquire the height distribution of the areas of the measuring points, and the height distribution of the areas of the measuring points indicates heights of all parts in the areas of the measuring points through heights of a set number of points in the areas of the measuring points; finally, the spatial locations of the areas of the measuring points can be obtained with reference to two-dimensional locations of the set number of measuring points in the areas of the measuring points, to provide a data support for subsequent machining of the CNC machine so that the CNC machine can carry out high-accuracy machining on an area to be machined in the areas of the measuring points.

The detector 51 are used for carrying out detection on the measuring points mainly in two ways. One is contact type detection, for example, probe sensors and the like; and the other is non-contact detection, for example, infrared ranging, ultrasonic ranging and the like.

Figure 15:
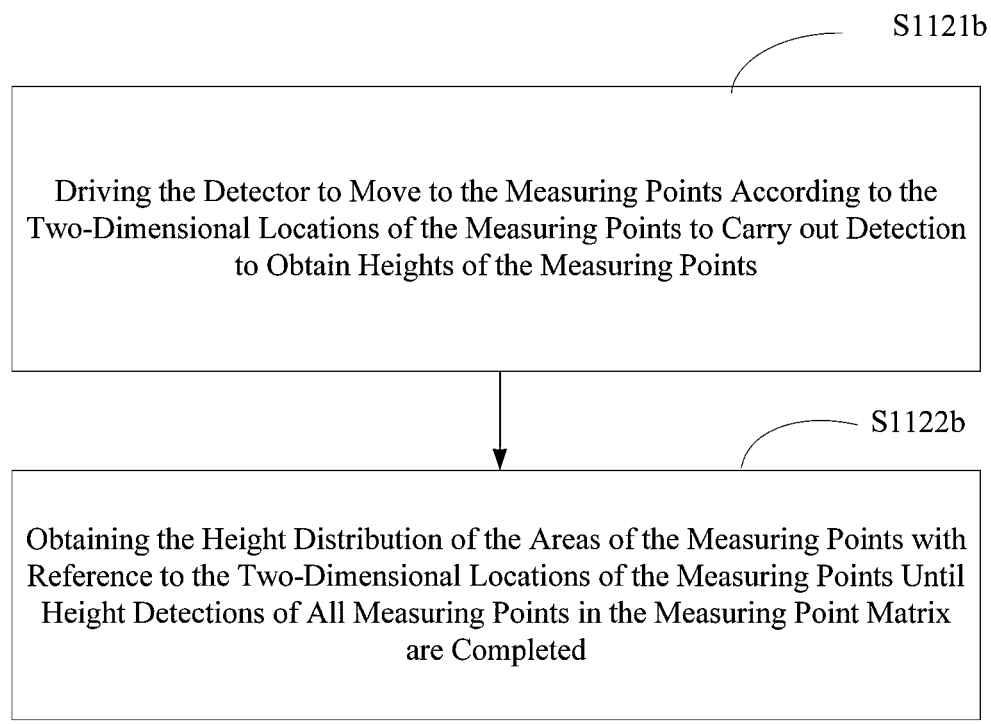
FIG. 15 is a flow diagram of driving the detector to move according to the limiting points to detect the height distribution of the areas of the measuring points and obtain the spatial locations corresponding to the areas of the measuring points according to an embodiment of the present application.

Referring to FIG. 15, FIG. 15 is a flow diagram of detecting a height distribution of the areas of the measuring points according to the limiting points to obtain three-dimensional locations corresponding to the areas of the measuring points according to an embodiment of the present application. The embodiment of the present application provides Step S112b of detecting a height distribution of the areas of the measuring points according to the limiting points to obtain corresponding three-dimensional locations of the areas of the measuring points, including:

Step S1121b, driving the detector 51 to move to the measuring points according to the two-dimensional locations of the measuring points to carry out detection to obtain heights of the measuring points; and Step S1122b, obtaining the height distribution of the areas of the measuring points with reference to the two-dimensional locations of the measuring points until height detections of all the measuring points in the measuring point matrix are completed.

The above two steps will be described in detail below.

In Step S1121b, drive the detector 51 to move to enable the tail ends of the detector 51 to be located above the measuring points according to the two-dimensional locations of the measuring points to measure heights of the measuring points. Exemplarily, in an embodiment of the present application, heights of the detector 51 at topmost ends are recorded, and then the detector 51 are moved in the vertical direction to obtain the heights of the measuring points with the topmost ends where the detector 51 are located as starting points and with the tail ends of the detector 51 in contact with the measuring points as end points according to the moving distances from the starting points to the end points and the heights of the detector 51 at the topmost ends.

In Step S1122b, the measuring points in the measuring point matrix are detected to acquire the heights of the measuring points by the method described in Step S221, and then with reference to the two-dimensional location of each measuring point, the height distribution of the areas of the measuring points is acquired.

Figure 16:
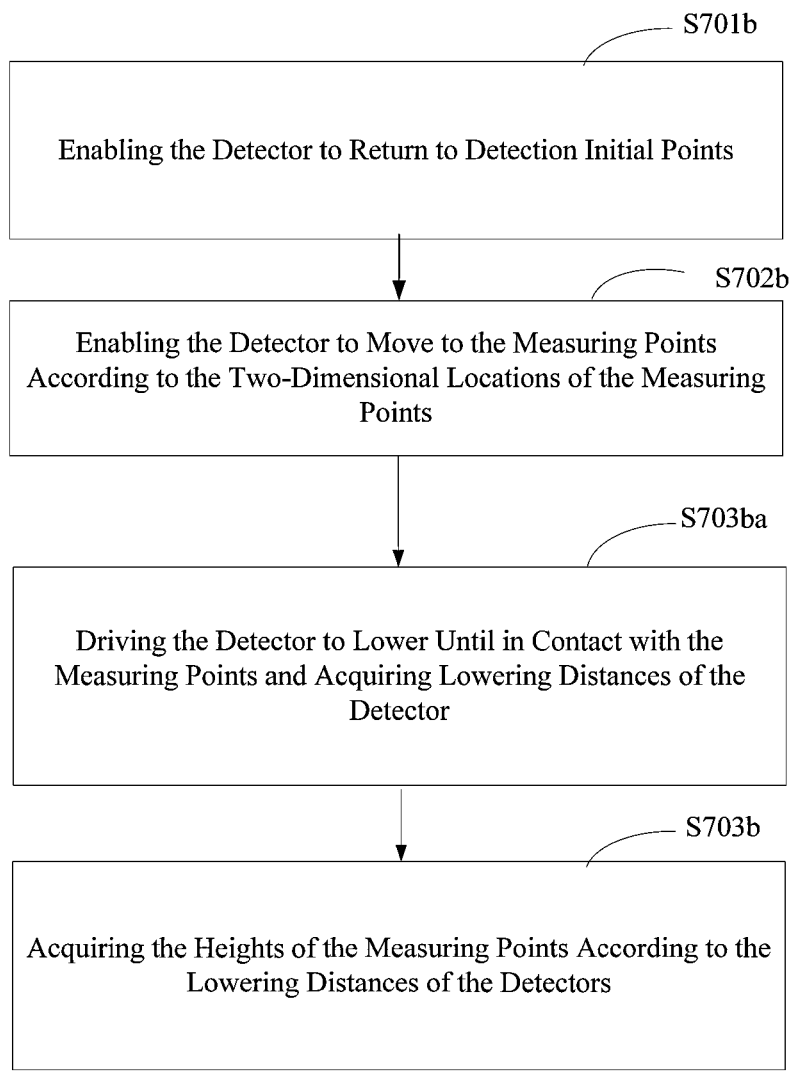
FIG. 16 is a flow diagram of driving the detector to move to the measuring points according to the two-dimensional locations of the measuring points to carry out detection to obtain heights of the measuring points according to an embodiment of the present application.

See FIG. 16, FIG. 16 is a flow diagram of driving the detector 51 to move to the measuring points according to the two-dimensional locations of the measuring points to carry out detection to obtain the heights of the measuring points according to an embodiment of the present application. The embodiment of the present application provides Step S1121b of driving the detector 51 to move to the measuring points according to the two-dimensional locations of the measuring points to carry out detection to obtain heights of the measuring points, including:

Step S701b, enabling the detector 51 to return to detection initial points;

Step S702b, enabling the detector 51 to move to the measuring points according to the two-dimensional locations of the measuring points;

Step S703b, driving the detector 51 to lower until the detector 51 are in contact with the measuring points and acquiring lowering distances of the detector 51; and Step S704b, acquiring the heights of the measuring points according to the lowering distances of the detector 51.

The above 4 steps will be described in detail below.

In Step S701b, drive the detector 51 to move up and down to return to the detection initial points at the given heights. The height of the detector refers to a height of the detector relative to a plane where the machined object is located.

In Step S702b, drive the detector 51 to move to the location above the measuring points according to the two-dimensional locations of the measuring points so that the detector 51 can carry out detection on the measuring points.

In Step S703b, drive the detector 51 located above the measuring points to lower to carry out detection until the detector 51 are in contact with the measuring points and acquire the lowering distances of the detector 51.

In Step S704b, according to the lowering distance of the detector 51 and the heights of the detection initial points, carry out computation to obtain the heights of the detector 51 when the detector 51 are in contact with the measuring points, namely the heights of the measuring points.

The implementation process set forth according to the embodiment (3) will be described in detail below.

Figure 17:
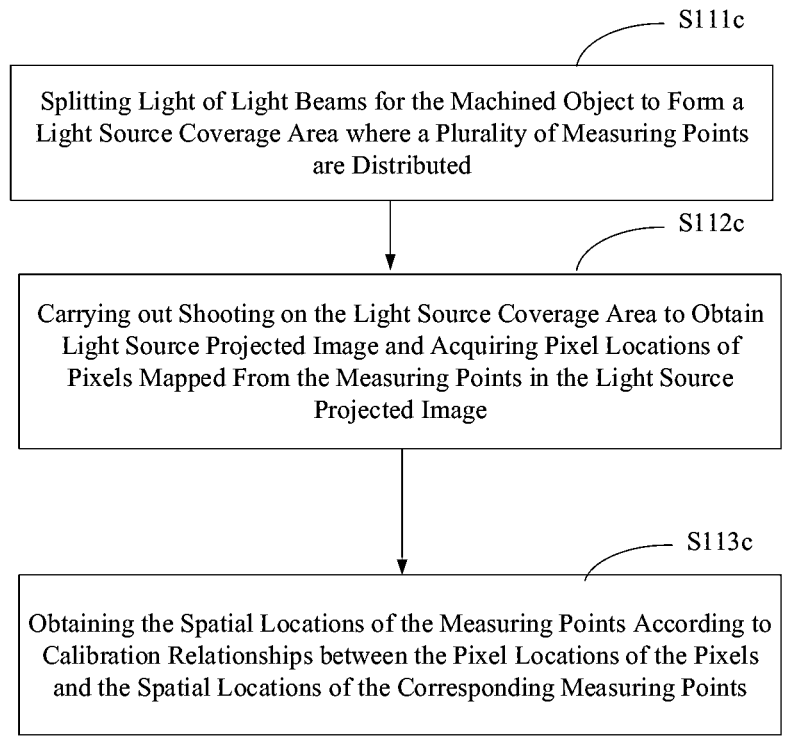
FIG. 17 is a flow diagram of acquiring the spatial locations of the measuring points for the machined object according to an embodiment of the present application.

Referring to FIG. 17, FIG. 17 is a flow diagram of acquiring the spatial locations of the measuring points for the machined object according to an embodiment of the present application. The embodiment of the present application provides the step of acquiring the spatial locations of the measuring points for the machined object, including:

Step S111c, splitting light of light beams for the machined object to form a light source coverage area where a plurality of measuring points are distributed;

Step S112c, carrying out shooting on the light source coverage area to obtain a light source projected image and acquiring pixel locations of pixels mapped from the measuring points in the light source projected image; and Step S113c, obtaining the spatial locations of the measuring points according to calibration relationships between the pixel locations of pixels and the spatial locations of the corresponding measuring points.

The 3 steps will be described in detail below.

In the embodiment of the present application, the method in the embodiment of the present application will be implemented, the CNC machine needs to be configured with light source and cameras linked to the light source and carry out light splitting on light paths of the light source emitting light beams to enable the light beams to represent a measurement pattern on the machined object. For example, grids are pasted on the light source to carry out light splitting on the light beams, and an area covered by the measurement pattern is a light source coverage area.

Exemplarily, the light source of the CNC machine is used for emitting the light beams to the machined object, the light paths of the light beams are changed by the grids pasted on the surfaces of the light source to carry out light splitting on the light beams to form the measurement pattern on the surface of the machined object corresponding to the grids, and the measurement pattern contains measuring points. Cameras are used for carrying out shooting on the measurement pattern formed on the machined object to obtain a light source projected image, and the light source projected image is used for acquiring pixels mapped from the measuring points on the light source projected image and pixel locations of the pixels. To be further explained, the light source and the cameras have known relative location relationships. The light source and the cameras are configured on the same movement mechanism of the CNC machine. When the movement mechanism is controlled to move by the CNC machine, the cameras move together with the light source.

In the embodiment of the present application, the grids are pasted to the surfaces of the light source in a paster mode to change the light paths of the light beams emitted by the light source to the machined object and form a measurement pattern corresponding to the grids on the machined object. Feature points in the measurement pattern serve as the measuring points. If in a lattice-type measurement pattern, intersection points between line segments serve as the measuring points.

To be clear, the light source and the grids may be an integrated device and are inseparable. The light source and the grids are integrally and detachably installed on the CNC machine, for example, painting or carving the grids at the front ends of the light source. In addition, the light source and the grids can also be a separable structure and can be separated and mounted or dismounted on the CNC machine respectively. For example, the front end of the light source is configured with a light source cap which is in a threaded connection with the light source. The light source cap is hollow. A glass grid is configured in the hollow part of the light source cap. The light beams emitted by the light source to the machined object may be visible light or other light capable of being captured and identified by the cameras, which is not limited here.

In Step S111c, before machining is carried out on the machined object, the light source is controlled to carry out light splitting and projection towards the machined object to form the measurement pattern, and an area covered by the measurement pattern is a light source coverage area. Feature points in the measurement pattern serve as the measuring points.

To be clear, in an embodiment of the present application, the grids are installed at the front end of the light source to carry out light splitting on the light beams projected by the light beams. To be clear, different types of grids can be distinguished according to the measurement pattern and shape mapped through the grids, such as a point matrix type and a lattice type. Exemplarily, the light source passes through the point matrix type grids to be projected on the machined object to obtain a point matrix pattern, and points in the point matrix pattern are the measuring points.

A pattern formed by the light source passing through the lattice-type grid forms the lattice-type pattern on the machined object. The lattice-type pattern is a pattern formed by a plurality of parallel lines (set as parallel lines A) and a plurality of parallel lines (set as parallel lines B, and A is not parallel to B) intersecting. Intersection points of the parallel lines A and the parallel lines B are the measuring points. In the application of the CNC machine, the grids with different numbers of measuring points and in different forms can be selected freely.

Figure 18:
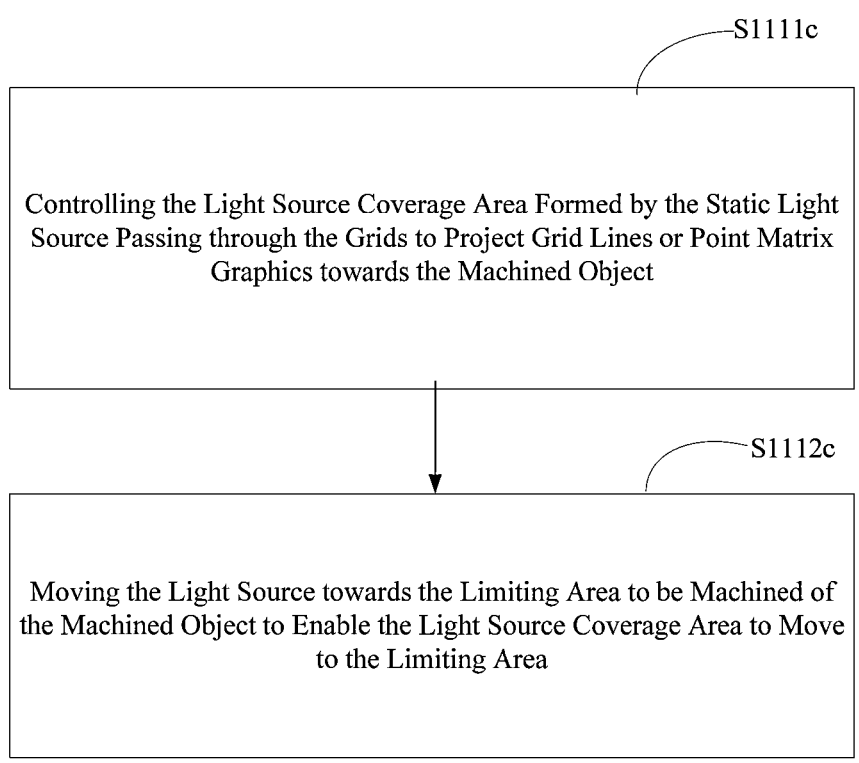
FIG. 18 is a flow diagram of carrying out light splitting on light beams for the machined object to form a light source coverage area according to an embodiment of the present application.

Referring to FIG. 18, FIG. 18 is a flow diagram of carrying out light splitting on light beams for the machined object to form a light source coverage area according to an embodiment of the present application. The embodiment of the present application provides Step S211c of carrying out light splitting on the light beams for the machined object to form a light source coverage area, including:

Step S1111c, controlling the light source coverage area formed by the static light source passing through the grids to project grid lines or point matrix graphics towards the machined object; and Step S1112c, moving the light source towards the limiting area to be machined of the machined object to enable the light source coverage area to move to the limiting area.

The two steps will be described in detail below.

In Step S1111c, the static light source in an original state respond to measurement operations of a user and are controlled to be turned on to pass through the grids and project light beams to the machined object to form a measurement pattern on the surface of the machined object, and an area of the measurement pattern is the light source coverage area.

In Step S1112c, when the measurement is started, the light source is located in its original location without being moved to a limiting area. To be further explained, when the CNC machine completes measurements on the limiting area, the light source returns to the original location. The CNC machine controls the light source to move to enable the light source coverage area to be located in the limiting area of the machined object.

To be further explained, when the machined object is measured, the light source coverage area is located in the limiting area of the machined object in two ways. One way is that the light source coverage area fully covers the limiting area, and the other way is that the light source coverage area partially covers the limiting area.

According to the size of the limiting area and the size of the light source coverage area, judge whether the light source coverage area covers the limiting area or not. If yes, do not carry out movement any longer, and implement the measurement step below. If not, implement the measurement step below on the current light source coverage area first, and then continuously control the light source to be moved to carry out measurements until the limiting area is measured completely.

In another embodiment of the present application, judge whether the light source coverage area covers the limiting area or not according to observation of an operator. If yes, do not carry out movement any longer, and implement the measurement step below. If not, implement the measurement step below on the current light source coverage area first, and then respond to operations of the operator to control the light source to be moved to carry out measurements until the limiting area is measured completely.

In Step S112c, after the light source coverage area is formed through light splitting of the light beams emitted by the light source, the measuring points are determined, at the moment, cameras are triggered to carry out shooting on the light source coverage area to obtain a light source projected image which has pixels mapped from the measuring points. Pixel locations of the pixels are identified according to the light source projected image and computed.

Figure 19:
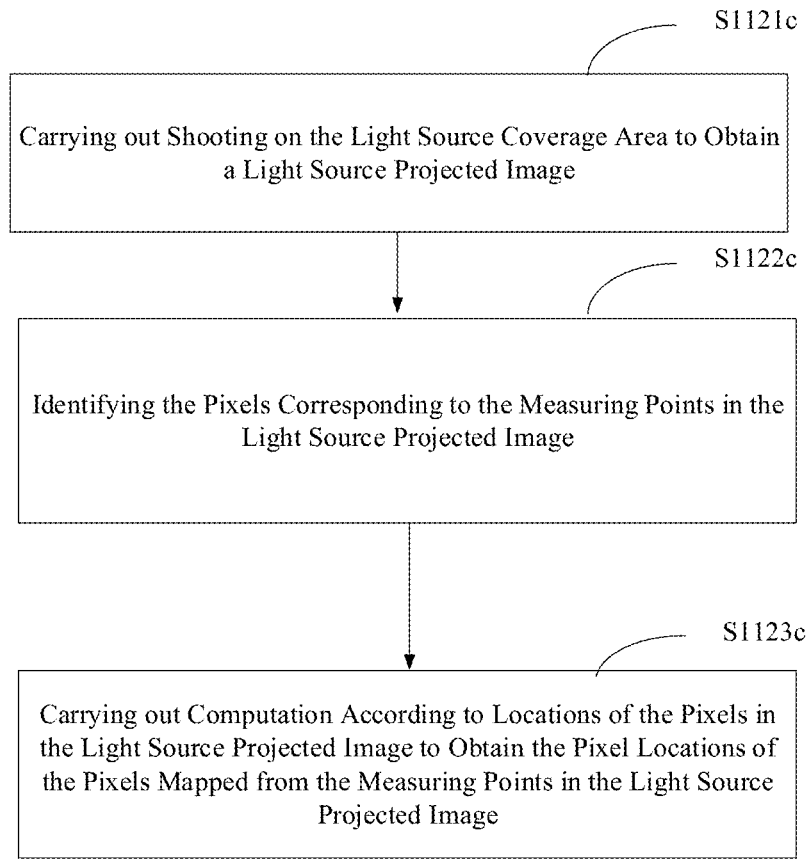
FIG. 19 is a flow diagram of carrying out shooting on the light source coverage area to obtain a light source projected image and acquiring pixel locations of pixels mapped from the measuring points in the light source projected image according to an embodiment of the present application.

Referring to FIG. 19, FIG. 19 is a flow diagram of carrying out shooting on the light source coverage area to obtain a light source projected image and acquiring pixel locations of pixels mapped from the measuring points in the light source projected image according to an embodiment of the present application. The embodiment of the present application provides Step S112c of carrying out shooting on the light source coverage area to obtain a light source projected image and acquiring pixel locations of pixels mapped from the measuring points in the light source projected image, including:

Step S1121c, carrying out shooting on the light source coverage area to obtain a light source projected image;

Step S1122c, identifying the pixels corresponding to the measuring points in the light source projected image; and Step S1123c, carrying out computation according to locations of the pixels in the light source projected image to obtain the pixel locations of the pixels mapped from the measuring points in the light source projected image.

The 3 steps will be described in detail below.

In Step S1121c, the light source has stopped moving, the light source coverage area has moved to the limiting area, and the camera having fixed relative location relationships with the light source is triggered at the time to carry out shooting on the light source coverage area to obtain the light source projected image.

In Step S1122c, identify the pixels corresponding to the measuring points in the light source projected image according to the light source projected image, for example, identify intersection points between lines in a grid pattern as the pixels, or identify points in the point matrix as the pixels. Establish corresponding relationships between the measuring points and the pixels mapped from the measuring points in the light source projected image and identify the measuring points corresponding to the pixels.

In Step S1123c, a two-dimensional coordinate system is established with the light source projected image as a plane, and the pixel locations of the pixels are obtained according to the locations of the pixels in the light source projected image. The pixel locations of the pixels are the locations of the pixels in the two-dimensional coordinate system established with the light source projected image as the plane.

In Step S113c, when the spatial locations of the measuring points are computed according to the pixel locations of the pixels identified in the shot image, a calibration file corresponding to the measuring points needs to be extracted from the CNC machine; and then the spatial locations of the measuring points are obtained according to the calibration relationships between the pixel locations of the pixels and the spatial locations of the measuring points corresponding to the pixels and location information of the cameras.

In an embodiment of the present application, when the cameras are local camera devices, the calibration relationships between the pixel locations of the pixels and reference spatial locations of the measuring points are pre-calibrated before Step S113c. The calibration relationships indicate corresponding relationships between the pixel locations of the pixels and the reference spatial locations of the measuring points. The reference spatial locations of the measuring points refer to spatial locations of the measuring points with camera shooting locations as reference points. Thus, to acquire the spatial locations of the measuring points, spatial locations of the measuring points in the CNC machine coordinate system need to be acquired according to the reference spatial locations of the measuring points and spatial locations of the cameras after the reference spatial locations of the measuring points are acquired.

In other words, when the cameras are the local camera devices, the pixel locations of the pixels in the calibration relationships correspond to the reference spatial locations of the measuring points with the camera shooting locations as the reference points.

When the cameras are panoramic shooting devices, the spatial locations of the measuring points corresponding to the pixels can be obtained directly according to the pixel locations of the pixels and the calibration relationships.

Figure 20:
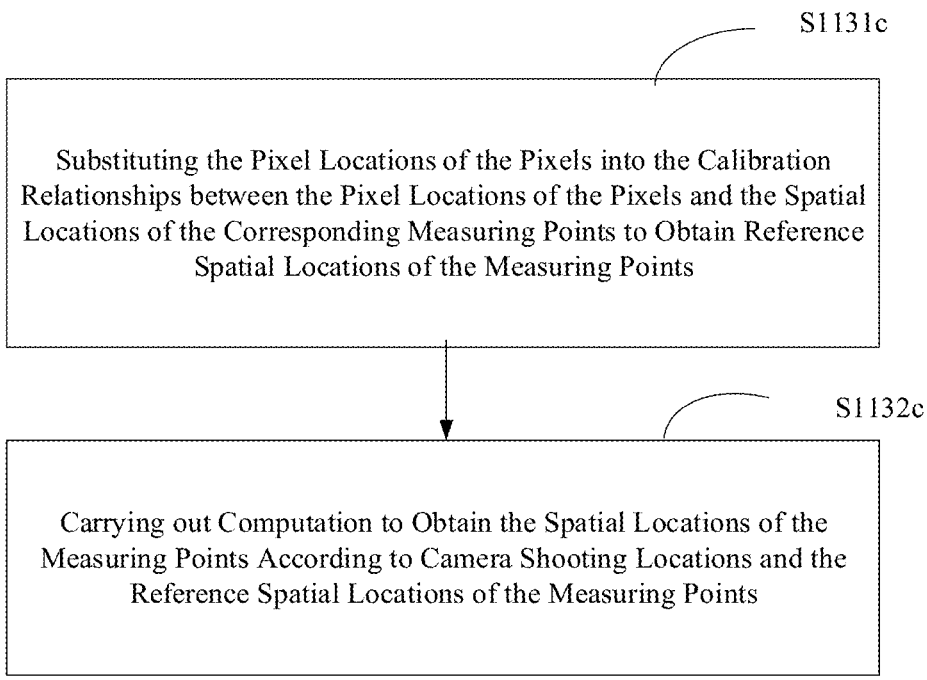
FIG. 20 is a flow diagram of obtaining the spatial locations of the measuring points according to calibration relationships between the pixel locations of the pixels and the spatial locations of the corresponding measuring points according to an embodiment of the present application.

Referring to FIG. 20, FIG. 20 is a flow diagram of obtaining the spatial locations of the measuring points according to the calibration relationships between the pixel locations of the pixels and the spatial locations of the corresponding measuring points according to an embodiment of the present application. The embodiment of the present application provides Step S113c of obtaining the spatial locations of the measuring points according to the calibration relationships between the pixel locations of the pixels and the spatial locations of the corresponding measuring points according to an embodiment of the present application, including:

Step S1131c, substituting the pixel locations of the pixels into the calibration relationships between the pixel locations of the pixels and the spatial locations of the corresponding measuring points to obtain reference spatial locations of the measuring points; and Step S1132c, carrying out computation to obtain the spatial locations of the measuring points according to camera shooting locations and the reference spatial locations of the measuring points.

The two steps will be described in detail below.

In Step S1131c, after implementing Step S112c of acquiring the light source projected image and obtaining the pixel locations of the pixels, read the calibration file to obtain the required calibration relationship during the implementation of Step S1131c.

The light source projected image obtained by shooting is an image where the measuring points correspond to the pixels. The pixel locations CX' of the pixels are obtained through image identification, sequential computation is carried out through the constructed linear functions to obtain Z', Y' and X'; and Z', Y' and X' form the reference spatial locations of the corresponding measuring points.

This is the computation process of the reference spatial location of one measuring point in the light source coverage area. In turn, the reference spatial locations of the measuring points are acquired respectively.

In Step S1132c, carrying out computation to obtain the spatial locations of the measuring points according to the reference spatial locations of the measuring points obtained in Step S1131c and the camera shooting locations in the CNC machine coordinate system.

In Step S120, mapping relationships between the measuring points are established according to the measuring points and the spatial locations of the measuring points acquired in Step S110. The mapping relationships are used as a description of a space distribution of the measuring points and location relationships between the measuring points.

For easy understanding, the mapping relationships between the measuring points can be presented as a type of a space model. The mapping relationships between the measuring points are embodied through the space model.

Exemplarily, when the number of the measuring point is one and a plane where the measuring point is located is in a horizontal condition, a rectangle is selected to establish a space plane model according to the measured spatial location and machining demands with the measuring point as a center of a diagonal to match a target processing graphic to obtain machining parameters. In addition, when the number of the measuring points is more, line fitting is carried out on the measuring points respectively, and plane fitting between the measuring points is implemented based on the line fitting between the measuring points. Therefore, a space model is constructed.

In other words, the space model is a numerical description of the areas of the measuring points provided for the machined object. For machining carried out by the CNC machine, the generated space model is used for carrying out machining alignment for machining of the CNC machine on the one hand and can also provide a machining preview service based on this on the other hand.

Figure 21:
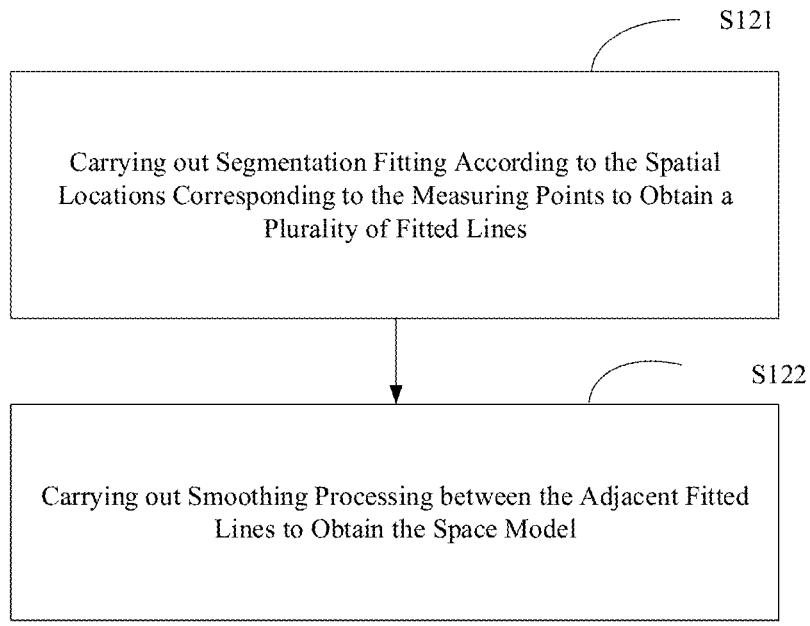
FIG. 21 is a flow diagram of constructing a space model based on the spatial locations of the measuring points according to an embodiment of the present application.

Further referring to FIG. 21, FIG. 21 is a flow diagram of constructing mapping relationships between the measuring points based on the spatial locations of the measuring points according to an embodiment of the present application. The mapping relationships are represented as the space model. The embodiment of the present application provides Step S120 of establishing mapping relationships between the measuring points according to the spatial locations of the measuring points, including.

Step S121, carrying out segmentation fitting according to the spatial locations respectively corresponding to the measuring points to obtain a plurality of fitted lines; and Step S122, carrying out smoothing processing between the adjacent fitted lines to obtain the space model.

The above two steps will be described in detail below.

In Step S121, carry out segmentation fitting on the measuring points in discrete distribution according to the spatial locations of the corresponding measuring points to obtain the plurality of fitted lines.

In Step S122, the space model is generated through Moving Least Squares (MLS), and then segmentation fitting and smoothing processing are carried out on the single measuring points or the measuring points in discrete distribution to obtain the space model. The fitted line through the MLS herein means that a line that best fits the machined object is fitted between the adjacent measuring points in the longitudinal or transverse direction. Line function parameters with a minimum error between data points are computed through the MLS according to coordinates of the measuring points. The line function parameters are used to achieve the optimum effect of line fitting. After line fitting, the lines are fitted by the MLS through corresponding points on two parallel lines to form a plurality of fitted lines between the two parallel lines, thereby realizing establishment of the space model. To be clear, the lines include but do not merely include curves and straight lines.

In Step S130, the space model is the numerical description of the areas of the measuring points provided by the machined object. For machining carried out by the CNC machine, the generated space model is used for carrying out machining alignment for machining on the one hand and can also provide the machining preview service based on this on the other hand. Based on this, machining is carried out on the machined object.

Figure 22:
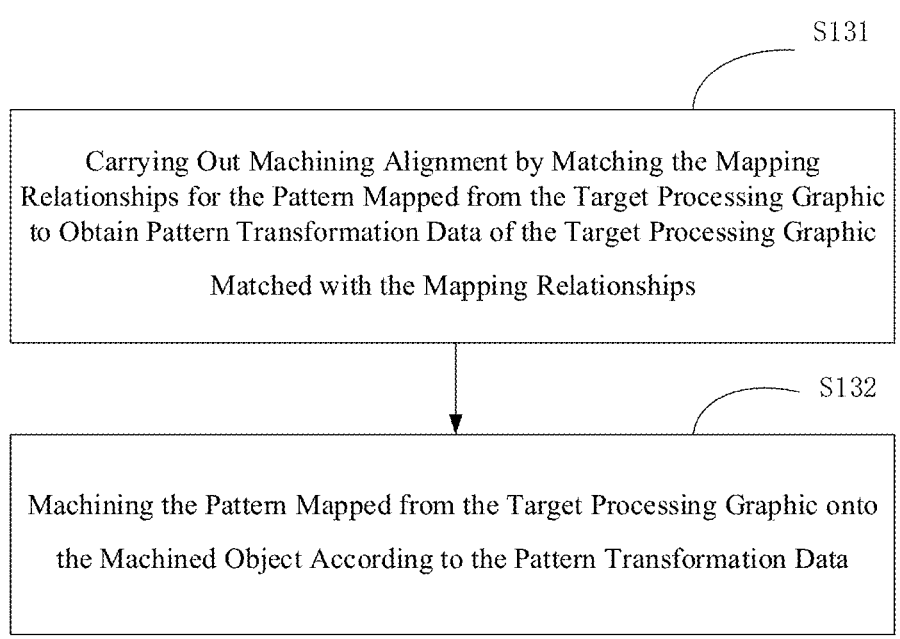
FIG. 22 is a flow diagram of carrying out machining of the target processing graphic on the machined object by matching the space model according to the target processing graphic according to an embodiment of the present application.

See FIG. 22, FIG. 22 is a flow diagram of carrying out machining of a target processing graphic on the machined object based on the target processing graphic matched with mapping relationships according to an embodiment of the present application. The embodiment of the present application provides Step S130 of carrying out matching of the target processing graphic on the machined object according to the target processing graphic matched with the mapping relationships, including:

Step S131, carrying out machining alignment by matching the mapping relationships for a pattern mapped from the target processing graphic to obtain pattern transformation data of the target processing graphic matched with the mapping relationships; and Step S132, machining the pattern mapped from the target processing graphic onto the machined object according to the pattern transformation data.

The above two steps will be described in detail below.

In Step 131, the target processing graphic of the CNC machine comes from a drawing library of an upper computer, user inputting, a screenshot of seeing and hearing files, or the like. The target processing graphic is used for providing a machined pattern for machining to be carried out currently, namely the pattern mapped from the target processing graphic. The target processing graphic includes but is not limited to fonts, lines, patterns and so on.

In other words, machining carried out according to the present application means that the pattern mapped from the target processing graphic is machined onto the machined object. The pattern mapped from the target processing graphic is suitable for the areas of the measuring points so that the pattern is machined onto a specific location of the machined object.

To be understood, both the location of the pattern machined onto the machined object and the placement of the pattern in this location can be designated, and the size of the machined pattern is also suitable for the designated placement location. Thus, the pattern can be rotated, translated and zoomed in or out according to designated configurations and is also suitable for irregular deformation of a machined curved surface of a curved machined object correspondingly.

Patten alignment is carried out on the space model to transform the pattern mapped from the target processing graphic to obtain pattern transformation data. The pattern transformation data numerically represents and describes the machined pattern.

Figure 23:
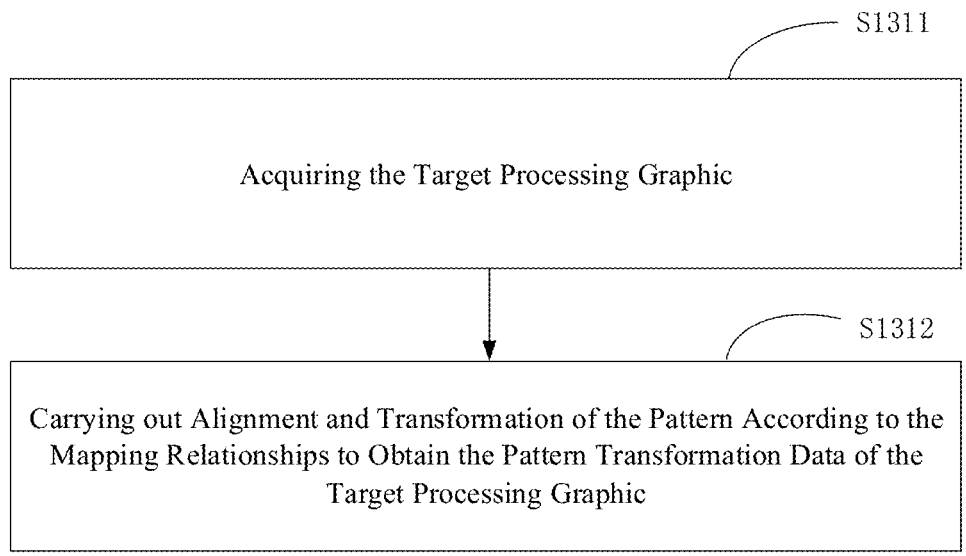
FIG. 23 is a flow diagram of matching the space model for the pattern mapped from the target processing graphic to carry out machining alignment and obtaining pattern transformation data of the target processing graphic on the space model according to an embodiment of the present application.

See FIG. 23, FIG. 23 is a flow diagram of matching the mapping relationship for the pattern mapped from the target processing graphic to carry out machining alignment to acquire pattern transformation data of the target processing graphic matched with the mapping relationship according to the target processing graphic an embodiment of the present application. The embodiment of the present application provides Step S131 of carrying out machining alignment by matching the mapping relationships for the pattern mapped from the target processing graphic to acquire pattern transformation data of the target processing graphic matched with the mapping relationship, including:

Step S1311, acquiring a target processing graphic; and

Step S1312, carrying out alignment and transformation of the pattern according to the mapping relationships to obtain the pattern transformation data of the target processing graphic.

As previously mentioned, the target processing graphic may be imported by an upper computer for machining carried out by the CNC machine, and the target processing graphic may be a bitmap or a vector diagram. Carry out pattern extraction on the target processing graphic imported by the upper computer to obtain the pattern machined on the machined object.

Pattern alignment means that a pattern is rotated, translated and zoomed in or out on the space model so that the pattern can be placed in the specified location on the machined object.

In Step S132, carry out the matching of the machined object for machining to acquire machining parameters. The acquired machining parameters include power, velocity of movement of a laser head and other parameters and are used for configuring laser emission power and velocity of movement of the light source for machining carried out by the CNC machine. Exemplarily, the machining parameters may be transmitted to the CNC machine by the upper computer for use by the CNC machine.

The process of machining the pattern mapped from the target processing graphic on the machined object is carried out under the control of the machining parameters and the pattern transformation data.

Figure 24:
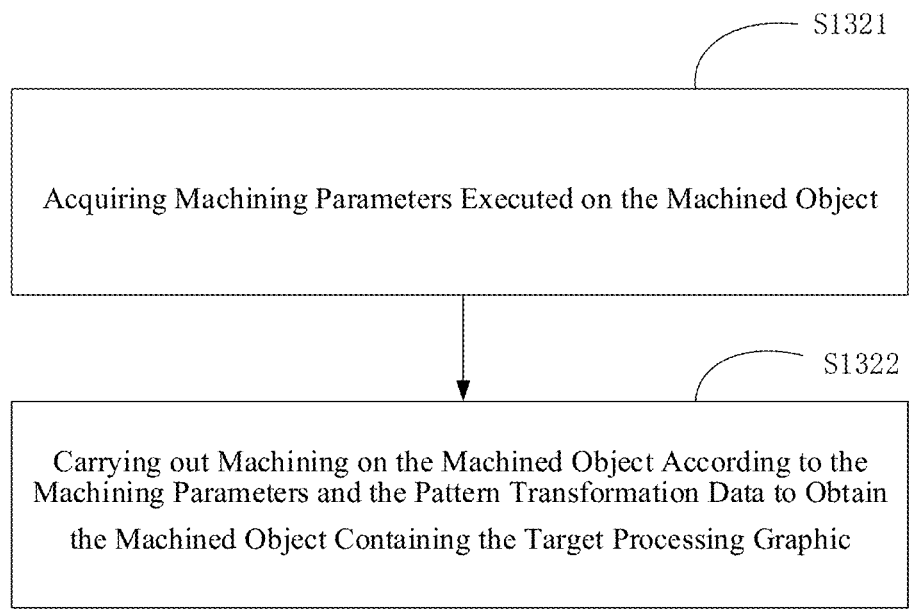
FIG. 24 is a flow diagram of machining the pattern mapped from the target processing graphic onto the machined object based on the pattern transformation data according to an embodiment of the present application.

Referring to FIG. 24, FIG. 24 is a flow diagram of machining the pattern mapped from the target processing graphic onto the machined object based on the pattern transformation data according to an embodiment of the present application. The embodiment of the present application provides Step S132 of machining the pattern mapped from the target processing graphic onto the machined object according to the pattern transformation data, including:

Step S1321, acquiring machining parameters executed on the machined object; and

Step S1322, carrying out machining on the machined object according to the machining parameters and the pattern transformation data to obtain the machined object containing the target processing graphic.

The acquired machining parameters are suitable for a material and the machining process of the machined object so that the CNC machine implements machining and movement control.

The CNC machine will drive the light source to move according to the machining parameters to machine the pattern onto the machined object and obtain the machined object with the machined pattern.

Figure 25:
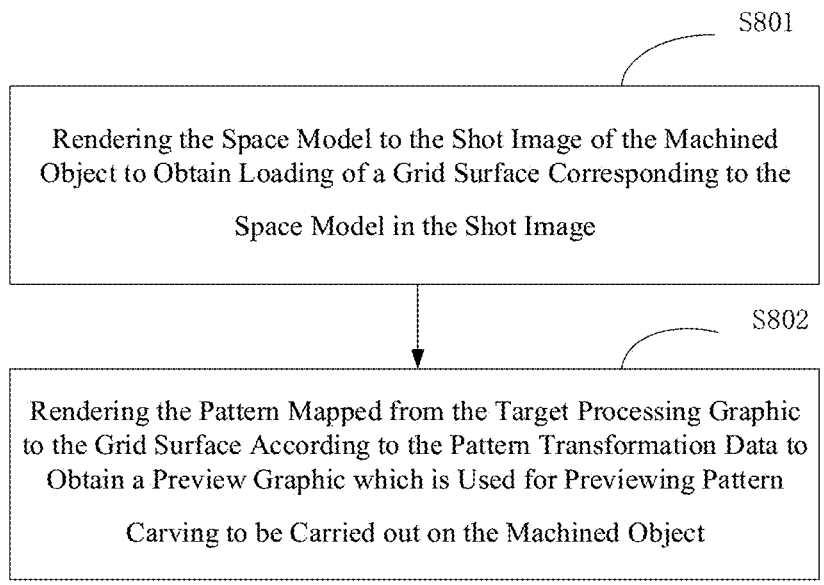
FIG. 25 is a flow diagram of a machining method according to an embodiment of the present application.

Referring to FIG. 25, FIG. 25 is a flow diagram of a machining method according to an embodiment of the present application. The embodiment of the present application provides the steps of a machining method, including:

Step S801, rendering the space model to the shot image of the machined object to obtain a loaded grid curve surface corresponding to the space model in the shot image; and Step S802, rendering the pattern mapped from the target processing graphic to the curve grid surface according to the pattern transformation data to obtain a preview graphic which is configured to preview pattern carving to be carried out on the machined object.

Under the action of the generated space model and the pattern transformation data obtained by matching the space model, the machining of the machined object is previewed to ensure the machining effect, so the machining carried out by the CNC machine used by the user is the what you see is what you get (WYSIWYG) machining process for the user.

According to the space model generated by rendering, exemplarily, rendering of the space model is carried out through an OpenGL rendering engine to obtain loading and displaying of the corresponding grid surface.

Figure 26:
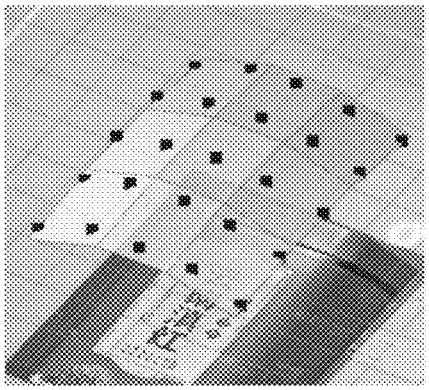
FIG. 26 and FIG. 27 are schematic diagrams of generating a curved surface of a curved machined object according to an embodiment of the present application.
Figure 27:
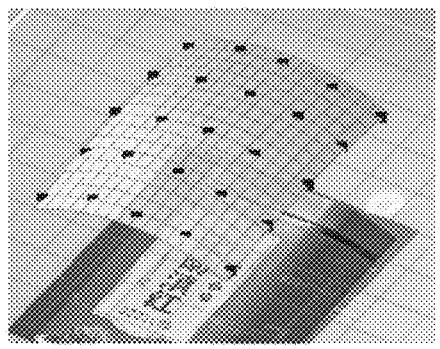

In an embodiment of the present application, with reference to a curved machined object, see FIG. 26 and FIG. 27, FIG. 26 and FIG. 27 are schematic diagrams of generating a curved surface of the curved machined object according to an embodiment of the present application. FIG. 26 is a generation phase of a curved surface of the curved machined object, segmentation fitting is carried out on the measuring point matrix composed of the measuring points by means of the MLS according to measured data and the spatial locations of the measuring points to obtain a plurality of fitted curves, and then smoothing processing is carried out between the adjacent fitted curves to obtain a curved surface model of the curved machined object as shown in FIG. 27. The OpenGL rendering engine carries out rendering of the curved surface model on the curved surface model of the machined object and a high-definition image of the machined object to generate the curved surface model of the curved machined object.

Figure 28:
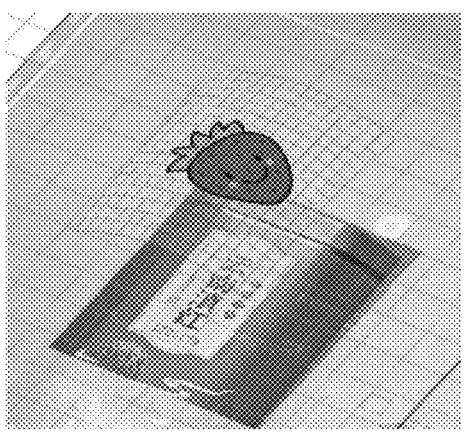
FIG. 28 and FIG. 29 are schematic diagrams of matching a curved surface model for the pattern mapped from the target processing graphic to carry out machining alignment and obtain a pattern of the target processing graphic on the curved surface model according to an embodiment of the present application.
Figure 29:
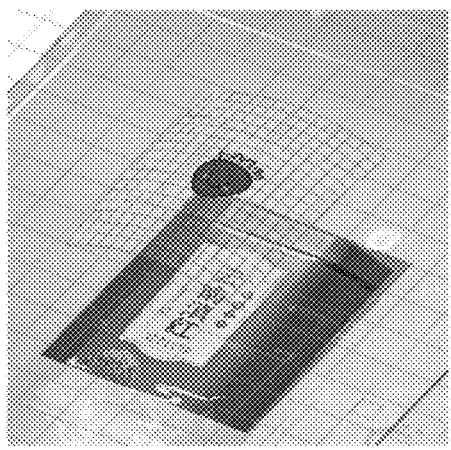

Referring to FIG. 28 and FIG. 29, FIG. 28 and FIG. 29 are schematic diagrams of matching a curved surface model for the pattern mapped from the target processing graphic to carry out machining alignment to obtain a pattern of the target processing graphic on the curved surface model according to an embodiment of the present application. After the curved surface model of the curved machined object is formed, the pattern mapped from the target processing graphic is suitable for machining alignment carried out on the formed curved surface model. During the alignment process, a pattern mapped from a carved object can be rotated, translated and zoomed in or out, and meanwhile, deformation is carried out on the pattern based on aligned pattern data according to the curved surface to obtain the pattern of the target processing graphic on the curved machined object as shown in FIG. 26.

In an embodiment of the present application, the CNC machine includes a movable head. At least one part of the machined object is located in a machining space of the CNC machine. The movable head can transmit electromagnetic energy to the machining space for machining the machined object.

In another embodiment of the present application, the step of carrying out matching of the target processing graphic on the machined object according to the target processing graphic matched with the space model includes:

generating a machining movement plan of the movable head based on mapping relationships;

generating a preview image including pre-manufacturing the target processing graphic on the machined object; and transmitting electromagnetic energy to the machined object by the CNC machine based on the machining movement plan to realize changes of the material of the machined object. The changes of the material include being carved, cutting, indenting, spraying a raw material for printing and the like.

The CNC machine includes a housing, at least part of the machining space is formed by the housing, the movable head is arranged in the housing, the housing includes an openable blocking member 91, and the blocking member 91 can weaken transmission of electromagnetic energy between the machining space and the exterior of the CNC machine to reduce damage of electromagnetic energy, such as laser spilling out of the housing, to the user.

The CNC machine includes at least one camera which is arranged in machining space and can capture at least one part of the image of the machined object.

FIG. 30 is a schematic diagram of hardware of the CNC machine according to an embodiment of the present application. As shown in FIG. 30, the CNC machine 100 includes a housing, a laser head 50, a laser tube 30 and a close-range camera 41. The housing includes a top housing 90 and a bottom housing 70. The close-range camera 41 is arranged on the laser head 50. The CNC machine 100 integrates cameras including but not limited to a panoramic camera for shooting panoramic machining images and the close-range camera 41, and the movable close-range camera 41 is moved to carry out shooting.

A reflecting mirror 10 is arranged between the laser head 50 and the laser tube 30. A laser produced by the laser tube 30 is reflected by the reflecting mirror 10 to the laser head 50 and then is emitted through being reflected, focused and so on to machine workpieces.

The housing of the CNC machine 100, namely the top housing 90 and the bottom housing 70 shown in FIG. 23, defines an internal space capable of containing the machined object. To carry out laser machining, the laser head 50, the laser tube 30 and the close-range camera 41 are arranged in the internal space, and the laser head 50 and the close-range camera 41 slide through configured a rail device 60.

The top housing 90 is further provided with a rotatable cover plate. An operator can open up the internal space by opening or closing the cover plate to put in or take workpieces out.

Under the blocking and/or filtering actions of the top housing 90 and the bottom housing 70, the laser emitted by the laser head 50 can be prevented from spilling out to cause personal injuries to the operator during work.

Exemplarily, the internal space can be further internally provided with rail device 60, and the laser head 50 is installed on the rail device 60. The rail device 60 may be X-axis and Y-axis guide rails. The X-axis and Y-axis guide rails can adopt guide rails such as linear guide rails or guide rails with smooth shafts and rollers in sliding fit. As long as the laser head 50 can be driven to move on an X-axis and a Y-axis to carry out machining. The laser head 50 can be further internally provided with a Z-axis moving guide rail used for being moved in a Z-axis direction to carry out focusing and machining before machining and/or during machining.

The machined object can be placed at the bottom of the internal space. The user puts the machined object in by opening the cover plate (namely the blocking member 91), then closes it and can also open the cover plate to take out the machined object.

The areas of the measuring points can be determined through the obtained spatial locations, and then the space model is generated based on this.

Figure 31:
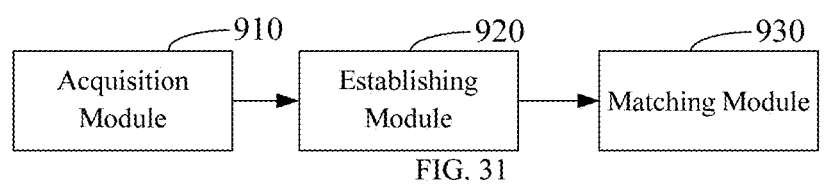
FIG. 31 is a schematic diagram of a machining device according to an embodiment of the present application.

See FIG. 31, FIG. 31 is a schematic diagram of a machining device according to an embodiment of the present application. In the embodiment of the present application, the machining device mainly includes the following modules:

an acquisition module 910 configured to establish mapping relationships between the measuring points according to the spatial locations of the measuring points;

an establishing module 920 configured to match the mapping relationships according to a target processing graphic and carry out machining of the target processing graphic on the machined object; and a matching module 930 configured to carry out machining of the target processing graphic on the machined object by matching the mapping relationships according to the target processing graphic.

Another embodiment of the present application provides a machining imaging method applicable to a computer numerical control (CNC) machine, specifically including the following steps:

Step S310, carrying out shooting through the long-range camera 42 and the close-range camera 41 to obtain a panoramic image and a close-range local image;

Step S320, correcting the panoramic image to obtain a corrected panoramic image suitable for a standard visual plane which is obtained by mapping a material bearing platform;

Step S330, carrying out highlighting processing on the corrected panoramic image to obtain a high-saturation panoramic image which is used for providing a content representation for visual display on the material bearing platform inside the CNC machine; and Step S340, loading the close-range local image with the high-saturation panoramic image as a background to obtain the high-definition image which is used for visual display on the material bearing platform inside the CNC machine.

The four steps will be described in detail below.

To be generally explained, the CNC machine is internally provided with a CNC machine. On the one hand, the CNC machine provides the material bearing platform, and on the other hand, the long-range camera 42 and the movable close-range camera 41 are integrated above the material bearing platform.

The material bearing platform is used for storing and bearing a processing material in the CNC machine. The long-range camera 42 and the close-range camera 41 are integrated above the material bearing platform. Because of a restraint of machine dimensions of the CNC machine, the long-range camera 42 is integrated at a highest location as much as possible. In contrast, the close-range camera 41 is relatively lower than the long-range camera 42. On the one hand, a view field that the long-range camera 42 can cover is guaranteed. On the other hand, the mobility of the close-range camera 41 is also guaranteed.

For example, in a machine type of the CNC machine, the height of the close-range camera 41 is 150 mm, and the height of the long-range camera 42 is 170 mm.

The long-range camera 42 is fixed in a single location to carry out shooting. The close-range camera 41 can freely move to any point to shoot an image. Both of them cooperate to complete imaging on the CNC machine, providing a WYSIWYG visualization service for the CNC machine.

In Step S310, as previously mentioned, on the CNC machine, whether the long-range camera 42 or the close-range camera 41 in the internal space of the CNC machine faces the material bearing platform to carry out shooting to form images. Based on this, imaging triggered by the CNC machine is triggered and carried out as the internal space of the CNC machine faces the material bearing platform.

No matter what kind of business function the CNC machine is carrying out, once imaging is triggered, the CNC machine will drive the long-range camera 42 and the close-range camera 41 to carry out shooting.

Specifically, shooting carried out by the long-range camera 42 is full-width shooting on the material bearing platform, and which is obtained is the panoramic image; the shooting process of the close-range camera 41 includes movements of its own and shooting motions. For the whole material bearing platform, the shooting motions are executed for close-range local shooting, and what is obtained is the close-range local image.

To be understood, with reference to imaging triggered and carried out as the CNC machine faces the material bearing platform, an imaged object must be a processing material on which machining is being carried out, is to be carried out, or even has been carried out. Different parts of the processing material have different machining precisions. The machining precisions of the different parts that are machined precisely will be different. Suitable machining precisions are needed for carrying out imaging on parts machined precisely. So far, the close-range camera 41 is moved freely to carry out imaging at a corresponding point to be suitable for precision machining of this part. High-precision image displaying of this part is achieved through the close-range camera 41. A demand for high-definition visualization of this part is met.

The long-range camera 42 carries out panoramic shooting and the close-range camera 41 moves to one or several points to carry out close-range local shooting on different machining precisions of different parts of a processing material to obtain a panoramic image and one or more close-range local images.

Panoramic shooting carried out by the fixed long-range camera 42 and close-range local shooting carried out by the moving close-range camera 41 provide dynamic, high-definition and high-precision visual display for laser cutting or carving carried out on the processing material so that the CNC machine can meet the demand for high-definition visualization of high-precision machining carried out on a certain part of the processing material. Thereby, this part is displayed visually in high definition.

Under the combined action of the shot panoramic image and the shot close-range local image, the CNC machine can dynamically match parts of the processing material with imaging at different visualization precisions when carrying out carving and cutting at different machining precisions on the processing material so that a visualization precision demand and a machining precision demand can be consistent.

Further, triggered imaging of the internal space of the CNC machine on the material bearing platform is a process of receiving an imaging operation of the CNC machine and responding to the imaging operation to trigger and drive the long-range camera 42 and the close-range camera 41.

Exemplarily, the imaging operation can be triggered by an image acquisition and canvas updating event. The image acquisition and canvas updating event can be triggered by either of initiated operation of the CNC machine and a user operation. Initiated operation of the CNC machine refers to initiating to carry out display updating of the CNC machine when a program of the CNC machine is online.

The user operation in the image acquisition and canvas updating event refers to either of an updating operation triggered by the user for visual display and a local high-definition visual operation. The updating operation is triggered to adapt to panoramic display and close-range local display carried out currently, and imaging is initiated again; the local high-definition visual operation refers to a high-definition visual operation initiated for a local area according to image displaying carried out now and at the moment, will be suitable for a specified local area to drive the close-range camera 41 to move and carry out shooting.

From this, the CNC machine will dynamically carry out shooting of the long-range camera 42 and the close-range local camera during the user operation or operation of the CNC machine and then is dynamically suitable for machining precisions of the parts to realize high-precision local display while visual display is executed for the whole laser carving or cutting process.

The embodiment of the present application provides a computer numerical control (CNC) machine imaging method. Before implementing Step S310, the CNC machine imaging method further includes:

Step S410, triggering an image acquisition and canvas updating event through initiated operation of the CNC machine and/or a user operation; and Step S420, triggering an imaging operation of an internal space of the CNC machine on a material bearing platform.

The two steps will be described in detail below.

In Step S410, the image acquisition and canvas updating event is used to trigger the imaging operation of the CNC machine, and then the imaging of the internal space of the CNC machine on the material bearing platform can be triggered under the control of the imaging operation.

On the one hand, the CNC machine that does not carry out image displaying will trigger the image acquisition and canvas updating event for the material bearing platform as the imaging operation is triggered; on the other hand, the CNC machine that carries out the image displaying carries out displaying updating to trigger the image acquisition and canvas updating event for requested display updating.

The image acquisition and canvas updating event is used for carrying out shooting to acquire images and then updating a canvas. The canvas is directly used for visual display. Exemplarily, in the implementation of Step S340, the canvas may be the obtained high-definition image. Thus, the canvas in the image acquisition and canvas updating event is updated, and a whole canvas, namely a high-definition image, can be obtained while the image displaying is not carried out. On the other hand, as image displaying is being carried out currently, canvas updating can also be updating of the loaded close-range local image.

Exemplarily, the image acquisition and canvas updating event includes: (1) automatic updating triggered as software is online, for example, an upper computer online operation triggered and carried out by the CNC machine; and (2) updating triggered under the user control, which is not listed one by one here.

Exemplarily, the execution of Step S410 includes:

An image acquisition updating event is triggered for the internal space of the CNC machine according to the upper computer online operation triggered and carried out by the CNC machine.

In an exemplary embodiment, as previously mentioned, the upper computer online operation is an initiated operation of the CNC machine. An upper computer carries out the online process so that the CNC machine is controlled by the upper computer to carry out service functions of its own.

The user has a visual demand for the initiated operation of the CNC machine, so the CNC machine will trigger the image acquisition and canvas updating event and then automatically carry out image displaying.

Exemplarily, the execution of Step S410 includes:
responding to an updating operation and/or a local high-definition visual operation triggered by the user on visual display to trigger the image acquisition and canvas updating event.

In an exemplary embodiment, the updating operation triggered by the user for the visual display is a process that the user requests to update image displaying carried out currently. The updating can be used to initiate updating of a displayed high-definition image.

Local high-definition visual operation is used to trigger and realize local high-definition visualization and can also be used to realize updating of local high-definition visualization.

As previously mentioned, displaying carried out is suitable for machining precisions. When the visualization precision of a specific image area is higher than that of other image areas, the carving and cutting process of the CNC machine displayed in parallel through multiple visualization precisions and what is obtained through carving and cutting are visually displayed. Whether visual display is not carried out now or visual display is being carried out currently, the local high-definition visual operation can be triggered to initiate local high-definition visualization of the specific image area or update the local high-definition visualization carried out on the specific image area.

Exemplarily, the local high-definition visual operation can be suitable for the machining precisions to be automatically triggered and can also be triggered under the user's control. For example, when the local high-definition visual operation is triggered, the close-range camera 41 is controlled to move to a specific area on the material bearing platform. FIG. 5 is a schematic diagram of a close-range camera 41 operating and control interface according to an embodiment of the present application. The embodiment of the present application provides an interface capable of operating and controlling the close-range camera 41. The user operates on the interface to enable the close-range camera 41 to move upwards, move downwards, move leftwards and move rightwards on the material bearing platform, even controlling the close-range camera 41 to return to zero in any location. The close-range camera 41 is controlled through user operations to initiate the local high-definition visual operation and carry out shooting at a high visualization precision on areas waiting for high-definition visualization one by one, thereby initiating the local high-definition visualization not carried out now or updating the local high-definition visualization carried out now.

An embodiment of the present application provides Step S310 of responding to triggered imaging of the internal space of the CNC machine on the material bearing platform so that the long-range camera 42 and the close-range camera 41 carry out shooting to obtain a panoramic image and local close-range images according to the image acquisition and canvas updating event triggered by the local high-definition visual operation, including:

Step S311, responding to a triggered imaging operation to drive the close-range camera 41 to move to an area mapped from the local high-definition visual operation on the material bearing platform; and Step S312, triggering the close-range camera 41 to carry out shooting of a close-range local image in the area.

The two steps will be described in detail below.

In Step S311, under the action of the local high-definition visual operation, the imaging operation triggered by the image acquisition and canvas updating event is to drive the close-range camera 41 to move to the area mapped from the local high-definition visual operation. Exemplarily, the close-range camera 41 operating and control interface shown in FIG. 5 shows a moving direction and distance of the close-range camera 41 as the local high-definition visual operation is triggered on the close-range camera 41 operating and control interface, and thus, the driven close-range camera 41 moves to a corresponding area above the material bearing platform along the moving direction and distance.

At the moment, Step S312 can be implemented to trigger the close-range camera 41 to shoot a close-range local image.

In turn, as for one-time imaging, namely relative to one panoramic image, the close-range camera 41 will carry out moving and shooting one or more times to obtain one or more close-range local images, and high-visualization-precision displaying corresponds to a high-machining-precision image area.

In Step S320, Step S310 is executed to obtain one panoramic image and one or more close-range local images. With reference to the panoramic image, the long-range camera 42 carries out full-width shooting on a visual plane within a view field range covered by the long-range camera 42 to obtain a corresponding view of the current whole visual plane.

Limited by a large width to be covered by the long-range camera 42, corners on the shot visual plane are distorted seriously, and the image shot by the long-range camera 42 needs to be corrected.

The correction is suitable for a standard visual plane. Specifically, the panoramic image is corrected to be suitable for the standard visual plane to obtain the corrected panoramic image. The standard visual plane exists relative to the visual plane shot by the long-range camera 42. Corners of the standard visual plane are not distorted, so the panoramic image is corrected based on the standard visual plane.

Specifically, the panoramic image is corrected to fit the standard visual plane according to a pixel mapping relationship between the panoramic image and the standard visual plane.

Exemplarily, the pixel mapping relationship between the panoramic image and the standard visual plane can be obtained through image correction. The pixel mapping relationship is established through image correction, for example, image correction can be carried out while leaving the factory. From this, the established pixel mapping relationship is:

$$dst(x,y)=src(i,j),$$

wherein dst(x,y) represents pixels of the panoramic image, and src(i,j) represents pixels in the standard visual plane.

The corners of the panoramic image are distorted seriously and need to be corrected according to the established pixel mapping relationship.

The corrected panoramic image shot according to an embodiment of the disclosure is obtained by correcting the seriously distorted panoramic image.

The pixel mapping relationship is established before leaving the factory so that correction carried out subsequently every time can be realized by calling the pre-established pixel mapping relationship.

An embodiment of the present application provides Step S320 of obtaining the corrected panoramic image suitable for the standard visual plane, including:

Step S321, calling the pre-established pixel mapping relationship between the image shot by the long-range camera 42 and the standard visual plane; and Step S322, carrying out mapping of each pixel in the panoramic image according to the pixel mapping relationship to obtain the corrected panoramic image suitable for the standard visual plane.

The two steps will be described in detail below.

In Step S321, as previously mentioned, relative to the standard visual plane, the long-range camera 42 carries out full-width shooting to pre-establish the pixel mapping relationship which is used to provide an expression of the pixel mapping relationship on the standard visual plane for full-width shooting of the long-range camera 42.

After the panoramic image shot by the long-range camera 42 is obtained, the pixel mapping relationship can be called for the panoramic image, and then the panoramic image can be corrected.

In Step S322, an expression of each pixel on the panoramic image on the standard visual plane is obtained according to the pixel mapping relationship, and then the pixels obtained correspondingly form the corrected panoramic image.

Through correction, panoramic visual display does not have deviations any more, corners are not distorted any longer, and image displaying carried out by the long-range camera 42 is greatly improved.

In Step S330, highlighting processing is carried out on the corrected panoramic image, namely improving brightness, to enable the image content displayed by the image to be enhanced to obtain a high-saturation panoramic image, thereby providing high-saturation and high-brightness visualization performance for imaging of the CNC machine.

Under the action of the high-saturation panoramic image, the performance of the CNC machine can be improved entirely and has a great contract effect relative to the panoramic image.

In Step S340, the high-saturation panoramic image obtained in Step 330 and at least one close-range local image shot in Step 310 will be fused so that a high-definition image obtained through merging in visual display carried out by the CNC machine can display laser cutting and carving carried out on the material bearing platform inside the CNC machine.

Specifically, the close-range local image is loaded into the high-saturation panoramic image with the high-saturation panoramic image as a background, so that high-definition displaying is carried out under the action of the high-saturation panoramic image and the close-range local image.

As for the high-definition image suitable for being displayed, at least one close-range local image is loaded so that not all image areas of the high-definition image correspond to the same visualization precision. Relative to other image areas, an individual image area will correspond to a high visualization precision.

The high-saturation panoramic image and the close-range local image provide brightness and visualization precisions for visual display carried out in whole and in part. Suitable user demands and machining precisions enhance a resolution ratio of corresponding image areas so that the image areas are displayed more clearly.

An embodiment of the present application provides Step S340 of loading the close-range local image to obtain the high-definition image with the high-saturation panoramic image as the background, including:

Step S341, positioning an image area mapped from the local high-definition visual operation on the high-saturation panoramic image;

Step S342, configuring the high-saturation panoramic image as a background; and

Step S343, covering the close-range local image onto the image area to obtain the high-definition image.

These steps will be described in detail below.

In Step S341, carry out full-width surface shooting with the high-saturation panoramic image as a background to obtain an image content which accurately displays the situation on the material bearing platform in real time. With reference to the close-range local image corresponding to the high-saturation panoramic image, at least one close-range local image shot by the close-range camera 41 needs to be loaded into a corresponding image area on the high-saturation panoramic image.

Thus, the image area on the high-saturation panoramic image is positioned for each close-range local image based on the triggered local high-definition visual operation. The local high-definition visual operation indicates the moving direction and distance involved in movement control of the close-range camera 41 for shooting. Thus, the image area mapped from each close-range local image on the high-saturation panoramic image can be positioned based on this.

In Step S343, with reference to the obtained high-saturation panoramic image, one or more non-overlapped close-range local images are selected to cover the corresponding areas of the high-saturation panoramic image to obtain high-visualization images of the displayed areas of the close-range local images.

With reference to the obtained high-saturation panoramic image, the multiple close-range local images have overlapped parts. With reference to the close-range images with the overlapped parts, a fusion relationship between the overlapped parts of the close-range local images is determined according to a distance from a unit area of the overlapped part of each close-range local image to a center point of the close-range local image, and the unit area refers to a minimum covering unit of the overlapped parts of the multiple close-range local images when covering each other. The center point refers to a center point under the close-range local image when the close-range local image is shot. A composite close-range local image is obtained and is covered on the corresponding image area of the high-saturation panoramic image.

An embodiment of the present application provides a flow diagram in which the multiple close-range local images have the overlapped parts, the overlapped parts of the multiple close-range local images are fused to obtain the composite close-range local image, and the composite close-range local image is covered on the corresponding area of the high-saturation panoramic image with reference to the obtained high-saturation panoramic image. An embodiment of the present application provides Step S343 of covering the composite close-range local image obtained by fusing overlapped areas between the two or more close-range local images onto the corresponding area of the high-saturation panoramic image to obtain the high-definition image, including:

S3431, computing a linear distance from a unit area to a center point of each close-range local image with reference to the overlapped part of the close-range local image, wherein the center point refers to a center point under the close-range camera 41 for shooting the close-range local image where the unit area is located;

S3432, determining a priority of each unit area of the overlapped part of each close-range local image; and S3433, covering the overlapped unit areas of the close-range local images to obtain the composite close-range local image according to the priority of the unit area of the overlapped part of each close-range local image and a priority order from high to low.

These steps will be described in detail below.

In Step S3431, the multiple close-range local images have the overlapped parts, and the computing accuracy of the unit area is accurate to a pixel level with the unit area of the overlapped part of each close-range local image as the selected minimum area.

When the overlapped parts of the close-range images are selected, if the overlapped parts are entirely selected, it cannot be ensured that the definition of each area of the selected overlapped parts is higher than that of the unselected overlapped parts, large errors exist, and the display effect is not clear enough. To minimize the errors, area division is carried out on the overlapped part of each close-range local image until an error is zero when divided areas are pixels of the overlapped parts. It is known that the smaller the area of a divided area is, the smaller the errors are.

The higher the resolution ratio of the image is, the clearer the image is, the higher the density of the pixels of the image is. The linear distance from the unit area of the close-range local image to the center point of the image is computed. The center point under the close-range local image is the clearest part of the close-range local image and is an area with the highest density of the pixels. The densities of the pixels decrease progressively and radially to edges with the center point under the close-range camera 41 as a center. Therefore, the definition of each unit area is represented through the linear distance.

In Step S3432, the priority of each unit area of the overlapped part of each close-range local image is determined according to the linear distance, ranking is carried out according to the priority of the unit area of the overlapped part of each close-range local image, and the smaller the linear distance is, the higher the priority is.

As described above, the smaller the linear distance is, the higher the density of the pixels of the overlapped unit areas is; the smaller the linear distance is, the clearer the unit area of the overlapped part of the close-range local image is, the higher the priority of the unit area is. The priority of the unit area means that the overlapped unit areas of the close-range local images have up-and-down location relationships when the overlapped unit areas of the close-range local images cover each other, and the higher the priority is, the closer to the top the location of the unit area is.

In Step S3433, according to the priorities of the unit areas of the overlapped parts of the close-range local images and the priority order from high to low, the overlapped unit areas of the close-range local images cover each other to obtain the coverage completed composite close-range local image. The composite close-range local image is loaded into the high-saturation panoramic image with the high-saturation panoramic image as the background, thereby carrying out high-definition displaying under the action of the high-saturation panoramic image and the close-range local images.

Because the loaded close-range local images are only limited to a part of the image area of the high-saturation panoramic image, the imaging time effectiveness is uninfluenced, and the consumed time is not increased. Through regionalization of the unit areas of the overlapped parts of the close-range local images, the precision and resolution ratio of the content expressed by the visual display are improved, so that WYSIWYG realized in the laser cutting and carving process has no deviation and inaccuracy.

The imaging process of the CNC machine is illustrated by taking a WYSIWYG service provided in the carving and cutting process carried out by the CNC machine as an example.

In an embodiment of the present application, the long-range camera 42 and the close-range camera 41 are triggered by the image acquisition and canvas updating event to carry out shooting processes respectively.

At first, it can be clear that a view field range of the long-range camera 42 is greater than that of the close-range camera 41. Thus, the long-range camera 42 carries out full-width shooting on the material bearing platform. The close-range camera 41 freely moves to a certain point to carry out shooting.

On the one hand, the long-range camera 42 triggers the image acquisition and canvas updating event when software is online and the user requests to update the images;

On the other hand, the close-range camera 41 triggers the image acquisition and canvas updating event after the software is online and the user controls the close-range camera 41 to move through operations and when the user requests to update the images.

At the moment, images are acquired by shooting to update a close-range canvas and a panoramic canvas to obtain a close-range local image and a panoramic image.

Based on this, the panoramic image is corrected by calling the pixel mapping relationship, and the corrected panoramic image is obtained through image correction.

After the corrected panoramic image is obtained through height processing, the close-range local image is loaded with the corrected panoramic image as the background, so that the demand of the user for high precision and high definition is met in a designated area to be suitable for high-precision machining of the area.

So far, the full-width content can be checked through fast imaging of the long-range camera 42. Through high-definition and high-precision close-range imaging, the deviation of WYSIWYG is small and can be suitable for high-precision operations.

Under the movement control, the close-range camera 41 carries out shooting in a location over the shot area. Thus, no projection deviation exists, and the accuracy of WYSIWYG is greatly enhanced.

According to an embodiment of the present application, a computer numerical control (CNC) machine imaging device is integrated into a CNC machine. The CNC machine includes a material bearing platform for bearing and storing a processing material and cameras integrated into the CNC machine. The cameras include a long-range camera 42 integrated over an internal space of the CNC machine and a movable close-range camera 41. The CNC machine imaging device includes:

a shooting module, configured to respond to triggered imaging of an internal space of the laser box CNC machine on a material bearing platform, and carry out shooting through the long-range camera 42 and the close-range camera 41 to obtain a panoramic image and a close-range local image;

a correction module, configured to correct the panoramic image to obtain a corrected panoramic image suitable for a standard visual plane which is obtained by mapping the material bearing platform;

a highlighting processing module, configured to carry out highlighting processing on the corrected panoramic image to obtain a high-saturation panoramic image which is used for providing a content representation for visual display on the material bearing platform inside the laser box CNC machine; and an image loading module, configured to load the close-range local image to obtain a high-definition image with the high-saturation panoramic image as a background, wherein the high-definition image is used for visual display on the material bearing platform inside the laser box CNC machine.

In an example, the CNC machine imaging device is further used for:

triggering an image acquisition and canvas updating event through initiated operation of the CNC machine and/or a user operation; and triggering an imaging operation of an internal space of the CNC machine on the material bearing platform through the image acquisition and canvas updating event.

In an example, the triggering an image acquisition and canvas updating event through initiated operation of the CNC machine and/or a user operation includes:

triggering an image acquisition and canvas updating event on an internal space of the CNC machine according to an upper computer online operation triggered and carried out by the CNC machine.

In an example, the triggering an image acquisition and canvas updating event through an initiated operation and/or a user operation of the CNC machine includes:

triggering the image acquisition and canvas updating event of the internal space of the CNC machine by closing and locking the internal space of the CNC machine.

In an example, the triggering an image acquisition and canvas updating event through an initiated operation and/or a user operation of the CNC machine includes:

responding to an updating operation and/or a local high-definition visual operation triggered by the user on visual display to trigger the image acquisition and canvas updating event.

In an example, with reference to the image acquisition and canvas updating event triggered by the local high-definition visual operation, the responding to triggered imaging of the internal space of the CNC machine on the material bearing platform to enable the long-range camera 42 and the close-range camera 41 to carry out shooting to obtain a panoramic image and a close-range local image includes:

responding to a triggered imaging operation to drive the close-range camera 41 to move to an area mapped from the local high-definition visual operation on the material bearing platform; and triggering the close-range camera 41 to carry out shooting of the close-range local image in the area.

In an example, the correcting the panoramic image to obtain a corrected panoramic image suitable for the standard visual plane includes:

calling a pre-established pixel mapping relationship between the image shot by the long-range camera 42 and the standard visual plane; and carrying out mapping of each pixel in the panoramic image according to the pixel mapping relationship to obtain the corrected panoramic image suitable for the standard visual plane through mapping of the pixels.

In an example, the loading a close-range local image to obtain a high-definition image with the high-saturation panoramic image as a background includes:

positioning an image area mapped from the local high-definition visual operation on the high-saturation panoramic image;

adjusting the size of the close-range local image to be suitable for the corresponding image area; and covering the image area with the close-range local image with the size adjusted to obtain the high-definition image by configuring the high-saturation panoramic image as the background.

Figure 32:
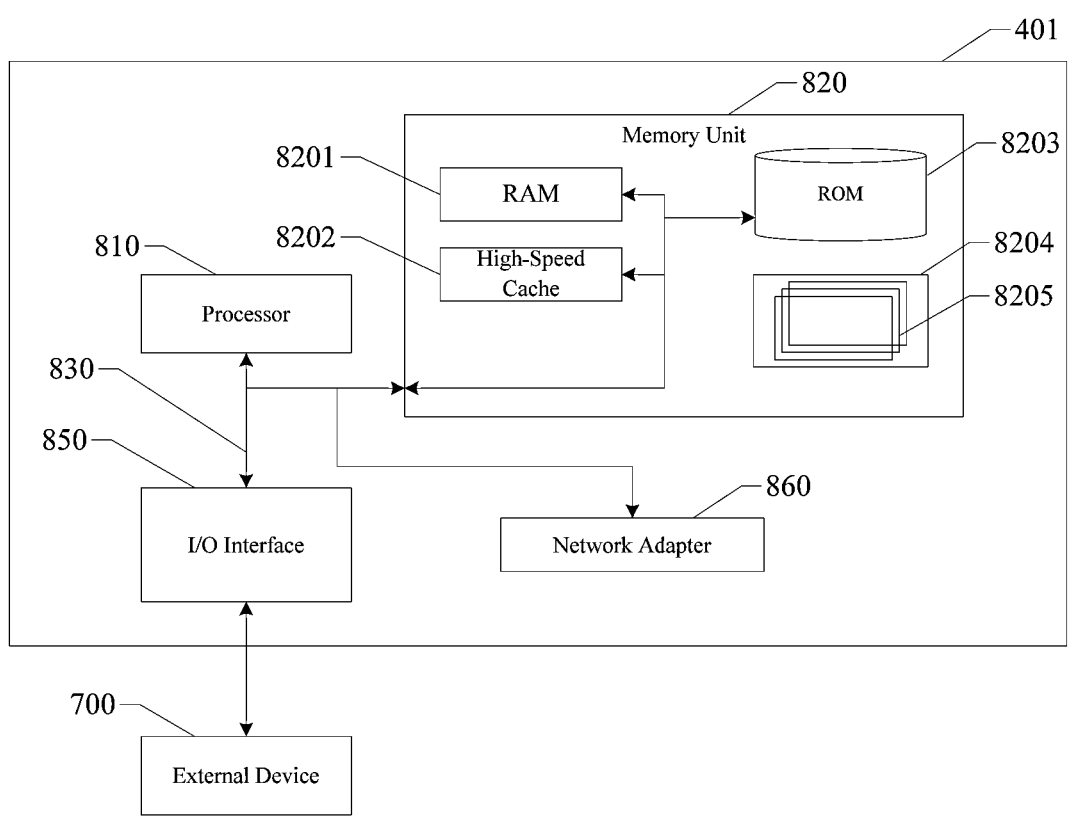
FIG. 32 is a structural diagram of hardware implementing the machining method according to an embodiment of the present application.

The machining method according to the embodiment of the present application can be implemented by the CNC machine in FIG. 32. The CNC machine according to an embodiment of the present application will be described below with reference to FIG. 32. The CNC machine shown in FIG. 32 is only an example without any limitation to functions and a range of application of the embodiment of the present application.

As shown in FIG. 32, the CNC machine can be expressed in the form of a general-purpose computing device. Components of the CNC machine may include but are not limited to at least one processor 810, at least one memory unit 820 and buses 830 for connecting different system components (including the memory unit 820 and the processor 810).

The memory unit is configured to store program codes. The program codes can be executed by the processor 810 to enable the processor 810 to execute the steps of various exemplary embodiments described in a description part of the exemplary method in this specification according to the present invention. For example, the processor 810 can execute the steps shown in FIG. 1.

The memory unit 820 may include a readable medium in the form of a volatile memory unit, for example, a random access memory (RAM) unit 8201 and/or a high-speed cache memory unit 8202, and may further include a read-only memory (ROM) unit 8203.

The memory unit 820 may further include a program/utility tool 8204 having a set of (at least one) program module 8205. Such a program module 8205 includes but is not limited to an operating system, one or more application programs, other program modules and program data. Each one or a certain combination in these examples may include an implementation of a network environment.

The buses 830 may be one or more of several bus structures, including a memory unit bus or a memory unit controller, a peripheral bus, an accelerated graphics port, a processor or a local area bus using any bus structure among the several bus structures.

The CNC machine may communicate with one or more external devices 700 (such as a keyboard, a pointing device and a Bluetooth device), may also communicate with one or more devices which can enable a user to interact with the CNC machine, and/or communicates with any device (such as a router and a modem) which enables the CNC machine to communicate with one or more other computing devices. Such communication can be carried out through an input/output (I/O) interface 850. Furthermore, the CNC machine may also communicate with one or more networks (such as a local area network (LAN), wide area network (WAN) and/or a public network such as the Internet) through a network adapter 860. As shown in the figure, the network adapter 860 communicates with other modules of a point cloud camera through the buses 830. To be clear, though not shown in the figure, other hardware and/or software modules can be used in conjunction with the CNC machine, including but not limited to microcodes, a device driver, a redundant processor, a peripheral disk drive array, a RAID system, a magnetic tape driver, a data backup and storage system, etc.

Through descriptions of the above implementations, it is easy for those skilled in the art to understand that the example implementations described herein may be realized through software or a combination of software and necessary hardware. Based on such understanding, the technical solution of the present application may be embodied in the form of a software product, which is stored in a non-volatile storage medium (which may be CD-ROM, U-disk, a mobile hard disk and the like) or networks, including a plurality of instructions used to enable a computing device (which may be a personal computer, a server, a terminal device or a network device, etc.) to perform the methods according to the embodiments of the present application.

The exemplary embodiment of the present application further provides a computer program medium which is configured to store computer-readable instructions. When the computer-readable instructions are executed by a processor of a computer, the computer executes the method described in the method embodiment.

An embodiment of the present application further provides a program product used for implementing the method in the above method embodiment, which can adopt a portable compact disk read-only memory (CD-ROM), includes program codes and can be run in a terminal device such as a personal computer. However, the program product of the present application is not limited to this. In the document, the readable storage medium may be any tangible medium including or storing programs. The programs can be used by an instruction execution system, apparatus or device or used in combination with them.

The program product may adopt any combination of one or more readable mediums. The readable mediums may be a readable signal medium or a readable storage medium. The readable storage medium, for example, can be but is not limited to electrical, magnetic, photic, electromagnetic, visible light or semi-conductive systems, devices or apparatuses, or any combinations thereof. More specific examples (non-exhaustive list) of the readable storage medium include electric connection with one or more conductors, portable disk, hard disk, random access memory (RAM), read-only memory (ROM), erasable programmable read-only memory (EPROM or flash memory), optical fiber, portable compact disk read-only memory (CD-ROM), light storage device, magnetic storage device, or any suitable combinations thereof.

A computer-readable signal medium may include a data signal propagating in a base band or as part of carriers, in which readable program codes are hosted. Such a propagated data signal may adopt many forms, including but not limited to electromagnetic signals, optical signals or any suitable combinations thereof. The readable signal medium may also be any readable medium other than the readable storage medium. The readable medium can send, propagate or transmit programs used by an instruction execution system, device or apparatus or a combination thereof.

The program codes included in the readable medium can be transmitted by using any suitable medium, including but not limited to wireless, wired, optical cables RF and so on, or any suitable combinations thereof.

Any combination of one or more program design languages can be used for editing program codes for executing operations in the present application. The program design languages include object-oriented program design languages such as Java and C++, and further include conventional program design languages such as C language or similar program design languages. The program codes can be completely executed on a user computing device, partially executed on a user device, executed as an independent software package, executed partially on the user computing device and partially on a remote computing device or completely executed on the remote computing device or a server. In the situation involving the remote computing device, the remote computing device can be connected to the user computing device through any type of networks including a local area network (LAN) or a wide area network (WAN), or can be connected to an external computing device (for example, connected through the Internet by an Internet service provider).

It should be noted that though a plurality of modules or units of equipment for motion execution are mentioned in the above detailed description, such a division is not compulsory. Actually, according to the implementations of the present application, the features and functions of two or more modules or units described above may be embodied in one module or unit. Instead, the features and functions of one module or unit described above may be further divided and embodied by the plurality of modules or units.

Besides, although the steps of the methods in the present application are described in the drawings in a specific order, this is not intended to require or imply that the steps must be performed in the specific order, or all the steps presented must be performed to achieve expected results. Additionally or alternatively, some steps may be omitted, the multiple steps may be combined into one step to be performed, and/or one step is divided into multiple steps to be performed and so on.

Through descriptions of the above implementations, it is easy for those skilled in the art to understand that the example implementations described herein may be realized through software or a combination of software and necessary hardware. Therefore, the technical solution of the present application may be embodied in the form of a software product, which is stored in a non-volatile storage medium (which may be CD-ROM, U-disk, a mobile hard disk and the like) or networks, including a plurality of instructions used to enable a computing device (which may be a personal computer, a server, a mobile terminal, a network device, etc.) to perform the methods according to the embodiments of the present application.

Those skilled in the art will think of other embodiments of the present application easily after considering the specification and practicing the present application. This application is intended to cover any variations, uses or adaptive changes of the present application following the general principles of the present application and including common general knowledge or customary technical means in the technical field not disclosed in this application. The specification and embodiments are only regarded as examples, and the real scope and spirit of this application are defined by the appended claims.

What is claimed is:

1. A machining method for a computer numerical control machine, comprising:

acquiring spatial locations of measuring points for a machined object;

establishing mapping relationships between the measuring points according to the spatial locations of the measuring points; and carrying out machining of a target processing graphic on the machined object by matching the mapping relationships according to the target processing graphic;

wherein acquiring the spatial locations of the measuring points for the machined object comprises:

obtaining the spatial locations of the measuring points by capturing irradiation points formed by emitted light beams on the measuring points of the machined object;

wherein obtaining the spatial locations of the measuring points by capturing the irradiation points formed by the emitted light beams on the measuring points of the machined object comprises:

acquiring a custom location corresponding to a location to be machined of the machined object;

generating a measuring point matrix according to the custom location;

emitting the light beams towards the measuring points in the measuring point matrix to form the irradiation points on the measuring points; and obtaining a shot image of at least one measuring point and acquiring the spatial locations of the measuring points according to pixel locations of the irradiation points in the shot image.

2. The method according to claim 1, wherein obtaining the spatial locations of the measuring points by capturing the irradiation points formed by the emitted light beams on the measuring points of the machined object further comprises:

obtaining the spatial locations of the measuring points according to calibration relationships between the pixel locations of the irradiation points and the spatial locations of the measuring points.

3. The method according to claim 2, wherein obtaining the spatial locations of the measuring points according to calibration relationships between the pixel locations of the irradiation points and the spatial locations of the measuring points further comprises:

carrying out shooting and capturing on the irradiation points formed by emitting the light beams in advance to obtain the corresponding shot image;

identifying the shot image to obtain the pixel locations of the irradiation points and acquiring the spatial locations of the irradiation points in a coordinate system of the CNC machine; and acquiring the pixel locations of different irradiation points and the spatial locations of the irradiation points multiple times, and carrying out linear fitting through a plurality of groups of data to obtain the calibration relationships.

4. The method according to claim 1, wherein after carrying out close-range shooting on the measuring points to obtain the shot image and acquiring the spatial locations of the measuring points according to the pixel locations of the irradiation points in the shot image, the method further comprises:

carrying out a single-point measurement of the measuring points to obtain the spatial locations of the measuring points, wherein the single-point measurement serves as an additional measurement of the measuring points in the measuring point matrix or a measurement of measuring points in a non-measuring point matrix.

5. The method according to claim 1, wherein the computer numerical control machine comprises a movable head, at least one part of the machined object is located in a machining space of the computer numerical control machine, and the movable head can transmit electromagnetic energy into the machining space to machine the machined object.

6. The method according to claim 5, wherein carrying out machining of the target processing graphic on the machined object by matching the mapping relationships according to the target processing graphic comprises:

generating a machining movement plan of the movable head based on the mapping relationships;

generating a preview image including pre-manufacturing the target processing graphic on the machined object; and transmitting the electromagnetic energy to the machined object by the computer numerical control machine based on the machining movement plan to change a material of the machined object.

7. The method according to claim 5, wherein a computer numerical control CNC machine comprises a housing, at least part of the machining space is formed by the housing, the movable head is arranged in the housing, the housing comprises an openable blocking member, and the blocking member is capable of weakening transmission of the electromagnetic energy between the machining space and an exterior of the CNC machine.

8. The method according to claim 5, wherein the movable head is provided with a close-range camera, and the close-range camera is moveable along with the movable head and obtains the shot image.

9. A computer numerical control machine, comprising:

a housing;

at least one of a detector and a light source;

a rail device configured to enable at least one of the detector and the light source to move;

a memory; and a processor;

wherein an internal space is formed in the housing, wherein the rail device and at least one of the detector and the light source are arranged in the internal space, and the memory is configured to store computer-readable instructions; and wherein the processor in electrical signal connection with the memory reads the computer-readable instructions stored in the memory to implement the machining method for the computer numerical control machine according to claim 1.

10. A system for a computer numerical control machine, comprising:

at least one processor; and at least one non-volatile storage medium for storing instructions executable by the at least one processor;

wherein the at least one processor is configured to implement the machining method for the computer numerical control machine according to claim 1.

11. The method according to claim 1, wherein acquiring the spatial locations of the measuring points for the machined object comprises:

acquiring two-dimensional locations of limiting points which indicate areas of the measuring points; and detecting a height distribution of the areas of the measuring points according to the limiting points to obtain corresponding three-dimensional locations of the areas of the measuring points.

12. The method according to claim 11, wherein acquiring the two-dimensional locations of the limiting points comprises:
obtaining the two-dimensional locations of the limiting points according to corresponding two-dimensional locations of light spots or a detector;
wherein obtaining the two-dimensional locations of the limiting points according to corresponding two-dimensional locations of light spots or the detector, comprises:
carrying out extraction of a moving distance to obtain the moving distance when a light source or the detector are driven to move towards the limiting points; and
obtaining the corresponding two-dimensional locations of the light spots or the detector as the two-dimensional locations of the limiting points according to the moving distance.

13. The method according to claim 11, wherein before detecting the height distribution of the areas of the measuring points according to the limiting points to obtain the corresponding three-dimensional locations of the areas of the measuring points, the method comprises:
generating a measuring point matrix according to the two-dimensional locations of the limiting points; and
acquiring a two-dimensional location of each measuring point in the measuring point matrix,
wherein the measuring points are configured to carry out height detection to obtain the height distribution of the areas of the measuring points.

14. The method according to claim 1, wherein the custom location is taken as a center of the measuring point matrix, and/or, the numbers of the measuring points on each row and column in the measuring point matrix based on an area of the measuring point matrix are set to generate the measuring point matrix.

15. The method according to claim 1, wherein areas to be machined or non-machined areas are distributed on the machined object, the measuring point matrix comprises an array of the area to be machined and an array of the non-machined area; and
a number of the measuring points in the array of the area to be machined is higher than a number of the measuring points in the array of the non-machined area to form a difference of the areas to be machined and the non-machined areas.

16. The method according to claim 1, wherein the shot image is obtained during the process of carrying out shooting by emitting light beams to form multiple points of the array; the multiple points of the array formed by emitting the light beams are obtained in different time domains in the measuring point matrix, and the multiple measured measuring points are distributed to form the measuring point matrix.

17. The method according to claim 16, wherein emitting the light beams towards the measuring points in the measuring point matrix to form the irradiation points on the measuring points; and obtaining a shot image of at least one measuring point and acquiring the spatial locations of the measuring points according to the pixel locations of the irradiation points in the shot image comprises:
irradiate the measuring points in the measuring point matrix one by one to form the irradiation points on the measuring points respectively; wherein the shot image obtained by shooting may correspond to one of the irradiation points, and the number of the shot image is matched with the measuring point matrix;
acquiring the pixel locations of the irradiation points according to the shot image, and
obtaining the spatial locations of the measuring points according to the calibration relationships between the pixel locations of the irradiation points and the spatial locations of the corresponding measuring points.

18. The method according to claim 17, wherein the machined object is a curved machined object, and the single-point measurements are carried out time by time through the visible light emitter, light beams are emitted to the measuring points to form irradiation points on the curved machined object, and shooting is carried out on the curved machined object containing the irradiation points to obtain the shot image; and
locations of the irradiation points are obtained through pixel locations of the irradiation points captured through the shot image, and the spatial location of each measuring point is acquired, until the measurements of all the measuring points in the measuring point matrix are completed.

19. The method according to claim 1, wherein the measuring points are configured to calibrate the area to be machined on the machined object, and the measuring points are in any location matched with the area to be machined.

20. The method according to claim 1, wherein emitting the light beams towards the measuring points in the measuring point matrix to form the irradiation points on the measuring points comprises:
emitting, by a visible light emitter configured in the Computer Numerical Control (CNC) machine, visible light towards the measuring points to form light spots on the measuring points, and the light spots are the irradiation points of the emitted light beams on the measuring points.

21. A machining method for a computer numerical control machine, comprising:
acquiring spatial locations of measuring points for a machined object;
establishing mapping relationships between the measuring points according to the spatial locations of the measuring points; and
carrying out machining of a target processing graphic on the machined object by matching the mapping relationships according to the target processing graphic;
wherein acquiring the spatial locations of the measuring points for the machined object comprises:
acquiring two-dimensional locations of limiting points which indicate areas of the measuring points; and
detecting a height distribution of the areas of the measuring points according to the limiting points to obtain corresponding three-dimensional locations of the areas of the measuring points.

22. The method according to claim 21, wherein acquiring the two-dimensional locations of the limiting points comprises:
obtaining the two-dimensional locations of the limiting points according to corresponding two-dimensional locations of light spots or a detector.

23. The method according to claim 22, wherein obtaining the two-dimensional locations of the limiting points according to corresponding two-dimensional locations of light spots or the detector, comprises:
carrying out extraction of a moving distance to obtain the moving distance when a light source or the detector are driven to move towards the limiting points; and obtaining the corresponding two-dimensional locations of the light spots or the detector as the two-dimensional locations of the limiting points according to the moving distance.

24. The method according to claim 21, wherein before detecting the height distribution of the areas of the measuring points according to the limiting points to obtain the corresponding three-dimensional locations of the areas of the measuring points, the method comprises:
generating a measuring point matrix according to the two-dimensional locations of the limiting points; and
acquiring a two-dimensional location of each measuring point in the measuring point matrix, wherein the measuring points are configured to carry out height detection to obtain the height distribution of the areas of the measuring points.

25. The method according to claim 24, wherein the limiting points are distributed in the same straight line, and generating the measuring point matrix according to the two-dimensional locations of the limiting points comprises:
taking connecting lines between the limiting points as diagonals and forming a limiting area by a rectangle where the diagonals are located; and
generating the measuring point matrix according to the limiting area.

26. The method according to claim 24, wherein acquiring the two-dimensional location of each measuring point in the measuring point matrix comprises:
carrying out computing to acquire the two-dimensional location of each measuring point in the measuring point matrix according to the two-dimensional locations of the limiting points and the numbers of rows and columns in the measuring point matrix.

27. The method according to claim 26, wherein carrying out computing to acquire the two-dimensional location of each measuring point in the measuring point matrix according to the two-dimensional locations of the limiting points and the numbers of rows and columns in the measuring point matrix comprises:
obtaining the two-dimensional locations of the measuring points coinciding with the limiting points according to the two-dimensional locations of the limiting points; and
carrying out computing to obtain the two-dimensional location of each measuring point according to the obtained two-dimensional locations of the measuring points and spacing distances between the rows and columns in the measuring point matrix.

28. The method according to claim 26, wherein carrying out computation to acquire the two-dimensional location of each measuring point in the measuring point matrix according to the two-dimensional locations of the limiting points and the numbers of rows and columns in the measuring point matrix comprises:
obtaining the two-dimensional locations of the measuring points coinciding with the limiting points according to the two-dimensional locations of the limiting points; and
carrying out computation to acquire the two-dimensional location of each measuring point according to the two-dimensional locations of the measuring points coinciding with the limiting points and the numbers of the rows and columns in the measuring point matrix.

29. The method according to claim 21, wherein detecting the height distribution of the areas of the measuring points according to the limiting points to obtain the corresponding three-dimensional locations of the areas of the measuring points comprises:
driving a detector to move to the measuring points according to the two-dimensional locations of the measuring points to carry out detection to obtain heights of the measuring points; and
obtaining the height distribution of the areas of the measuring points with reference to the two-dimensional locations of the measuring points until height detections of all the measuring points in a measuring point matrix are completed.

30. The method according to claim 29, wherein driving the detector to move to the measuring points according to the two-dimensional locations of the measuring points to carry out detection to obtain heights of the measuring points comprises:
enabling the detector to return to initial detection points;
enabling the detector to move to the measuring points according to the two-dimensional locations of the measuring points;
driving the detector to lower until the detector are in contact with the measuring points and acquiring lowering distances of the detector; and
acquiring the heights of the measuring points according to the lowering distances of the detector.

31. The method according to claim 21, wherein the computer numerical control machine comprises a movable head, at least one part of the machined object is located in a machining space of the computer numerical control machine, and the movable head can transmit electromagnetic energy into the machining space to machine the machined object;
wherein carrying out machining of the target processing graphic on the machined object by matching the mapping relationships according to the target processing graphic comprises:
generating a machining movement plan of the movable head based on the mapping relationships;
generating a preview image including pre-manufacturing the target processing graphic on the machined object; and
transmitting the electromagnetic energy to the machined object by the computer numerical control machine based on the machining movement plan to change a material of the machined object;
wherein a computer numerical control CNC machine comprises a housing, at least part of the machining space is formed by the housing, the movable head is arranged in the housing, the housing comprises an openable blocking member, and the blocking member is capable of weakening transmission of the electromagnetic energy between the machining space and an exterior of the CNC machine.

32. A computer numerical control machine, comprising:
a housing;
at least one of a detector and a light source;
a rail device configured to enable at least one of the detector and the light source to move;
a memory; and
a processor;
wherein an internal space is formed in the housing, wherein the rail device and at least one of the detector and the light source are arranged in the internal space, and the memory is configured to store computer-readable instructions; and wherein the processor in electrical signal connection with the memory reads the computer-readable instructions stored in the memory to implement the machining method for the computer numerical control machine according to claim 21.

33. A system for a computer numerical control machine, comprising:
    at least one processor; and
    at least one non-volatile storage medium for storing instructions executable by the at least one processor;
    wherein the at least one processor is configured to implement the machining method for the computer numerical control machine according to claim 21.

34. A machining method for a computer numerical control machine, comprising:
    acquiring spatial locations of measuring points for a machined object;
    establishing mapping relationships between the measuring points according to the spatial locations of the measuring points; and
    carrying out machining of a target processing graphic on the machined object by matching the mapping relationships according to the target processing graphic;
    wherein the mapping relationships are represented as a space model, and establishing the mapping relationships between the measuring points according to the spatial locations of the measuring points comprises:
        carrying out segmentation fitting according to the spatial locations corresponding to the measuring points; and
        obtaining the space model based on the segmentation fitting.

35. The method according to claim 34, wherein the segmentation fitting comprises carrying out segmentation fitting according to the spatial locations corresponding to the measuring points to obtain a plurality of fitted lines; and carrying out smoothing processing between the adjacent fitted lines.

36. A machining method for a computer numerical control machine, comprising:
    acquiring spatial locations of measuring points for a machined object;
    establishing mapping relationships between the measuring points according to the spatial locations of the measuring points; and
    carrying out machining of a target processing graphic on the machined object by matching the mapping relationships according to the target processing graphic;
    wherein matching the mapping relationships according to the target processing graphic and carrying out machining of the target processing graphic on the machined object comprises:
        matching the mapping relationships for a pattern mapped from the target processing graphic to carry out machining alignment and obtain pattern transformation data of the target processing graphic matched with the mapping relationships; and
        machining the pattern mapped from the target processing graphic onto the machined object according to the pattern transformation data.

37. The method according to claim 36, wherein matching the mapping relationships for the pattern mapped from the target processing graphic to carry out machining alignment and obtain the pattern transformation data of the target processing graphic matched with the mapping relationships comprises:
    acquiring the target processing graphic; and
    carrying out alignment and transformation of the pattern according to the mapping relationships to obtain the pattern transformation data of the target processing graphic.

38. The method according to claim 36, wherein the machining the pattern mapped from the target processing graphic onto the machined object according to the pattern transformation data comprises:
    acquiring machining parameters executed on the machined object; and
    carrying out machining on the machined object according to the machining parameters and the pattern transformation data to obtain the machined object containing the target processing graphic.

39. The method according to claim 36, wherein the mapping relationships are represented as a space model, wherein the method further comprises:
    rendering the space model to a shot image of the machined object to obtain a loaded grid curve surface corresponding to the space model in the shot image; and
    rendering the pattern mapped from the target processing graphic to the grid curve surface according to the pattern transformation data to obtain a preview graphic which is used configured to for previewing pattern carving to be carried out on the machined object.

* * * * *